United States Patent
Wang et al.

(10) Patent No.: US 11,764,615 B2
(45) Date of Patent: Sep. 19, 2023

(54) RADIATIVE WIRELESS CHARGING SYSTEM

(71) Applicant: Google LLC, Mountain View, CA (US)

(72) Inventors: Max Li-Hua Wang, Stanford, CA (US); Maryam Tabesh, San Francisco, CA (US); Jiang Zhu, Cupertino, CA (US)

(73) Assignee: Google LLC, Mountain View, CA (US)

( * ) Notice: Subject to any disclaimer, the term of this patent is extended or adjusted under 35 U.S.C. 154(b) by 257 days.

(21) Appl. No.: 16/822,122

(22) Filed: Mar. 18, 2020

(65) Prior Publication Data

US 2021/0013747 A1    Jan. 14, 2021

Related U.S. Application Data

(60) Provisional application No. 62/872,854, filed on Jul. 11, 2019.

(51) Int. Cl.
*H02J 7/00* (2006.01)
*H02J 50/20* (2016.01)
(Continued)

(52) U.S. Cl.
CPC ............... *H02J 50/20* (2016.02); *H02J 7/02* (2013.01); *H02J 50/402* (2020.01); *H02J 50/80* (2016.02); *H04B 5/0037* (2013.01)

(58) Field of Classification Search
USPC .................. 320/106, 107, 108, 109, 110
See application file for complete search history.

(56) References Cited

U.S. PATENT DOCUMENTS 10,008,875 B1 * 6/2018 Leabman ................ H02J 50/80
10,158,259 B1 * 12/2018 Leabman ............ H02J 7/00045
(Continued)

FOREIGN PATENT DOCUMENTS

CN         106953668 A      7/2017
EP           3154153 A1      4/2017
(Continued)

OTHER PUBLICATIONS

Chou, Hsi-Tseng et al. Synthesis of microstrip antenna arrays for optimum near-field patterns via steepest decent method, Antennas and Propagation (APSURSI), 2011 IEEE International Symposium on, IEEE, Jul. 3, 2011 (Jul. 3, 2011), pp. 1723-1726, XP032191354, DOI: 10.1109/APS.2011.5996640.

(Continued)

*Primary Examiner* — Brian Ngo
(74) *Attorney, Agent, or Firm* — Lerner David LLP

(57) ABSTRACT

The technology provides for a wireless charger. The wireless charger may have a transmitter antenna array, one or more detectors, one or more sensors, and one or more processors. For instance, the processors may determine, based on signals from the detectors, that one or more receiver antennas are located within a near-field range of the transmitter antenna array. The processors may then control the transmitter antenna array to focus electromagnetic waves on a first receiver antenna of the one or more receiver antennas, and control the transmitter antenna array to transmit power to the first receiver antenna. In some instances, the processors may further determine, based on signals from the sensors, that a person is located within the near-field range of the transmitter antenna array. Based on this determination, the processors may control the transmitter antenna array to stop transmitting power to the first receiver antenna.

21 Claims, 15 Drawing Sheets

(51) Int. Cl.
*H02J 50/80* (2016.01)
*H02J 50/40* (2016.01)
*H02J 7/02* (2016.01)
*H04B 5/00* (2006.01)

(56) References Cited

U.S. PATENT DOCUMENTS

2017/0085127 A1* 3/2017 Leabman ................ H02J 50/80
2020/0006988 A1* 1/2020 Leabman ................ H05B 3/34
2022/0045554 A1* 2/2022 Leabman ................ H02J 50/40

FOREIGN PATENT DOCUMENTS

JP    2019506826 A  *  3/2019
KR    20160135238 A *  11/2016

OTHER PUBLICATIONS

Extended European Search Report for European Patent Application No. 20181756.6 dated Nov. 23, 2020. 10 pages.
Liu, Shilin et al. A Near Field Focused Lens Antenna for Wireless Power Transmission Systems. 2018 IEEE Asia-Pacific Conference on Antennas and Propagation (APCAP), IEEE, Aug. 5, 2018 (Aug. 5, 2018), pp. 313-315, XP033448306, DOI: 10.1109/APCAP.2018.8538187.
Nepa, P. "Near-Field Focused Antennas for Wireless Communications and Power Transfer." Apr. 18-20, 2016. International Spring School on Electromagnetics and emerging technologies for pervasive applications: Internet of Things, Health and Safety. Bologna, Italy. 49 pages.
Nepa, P. and A. Buffi. "Near-Field-Focused Microwave Antennas." Apr. 26, 2017. IEEE Antennas & Propogation Magazine. Jun. 2017. pp. 42-53.
Office Action for European Patent Application No. 20181756.6 dated Mar. 1, 2022. 7 pages.
Office Action for Chinese Patent Application No. 202010585225.3 dated Dec. 21, 2022. 9 pages.

* cited by examiner

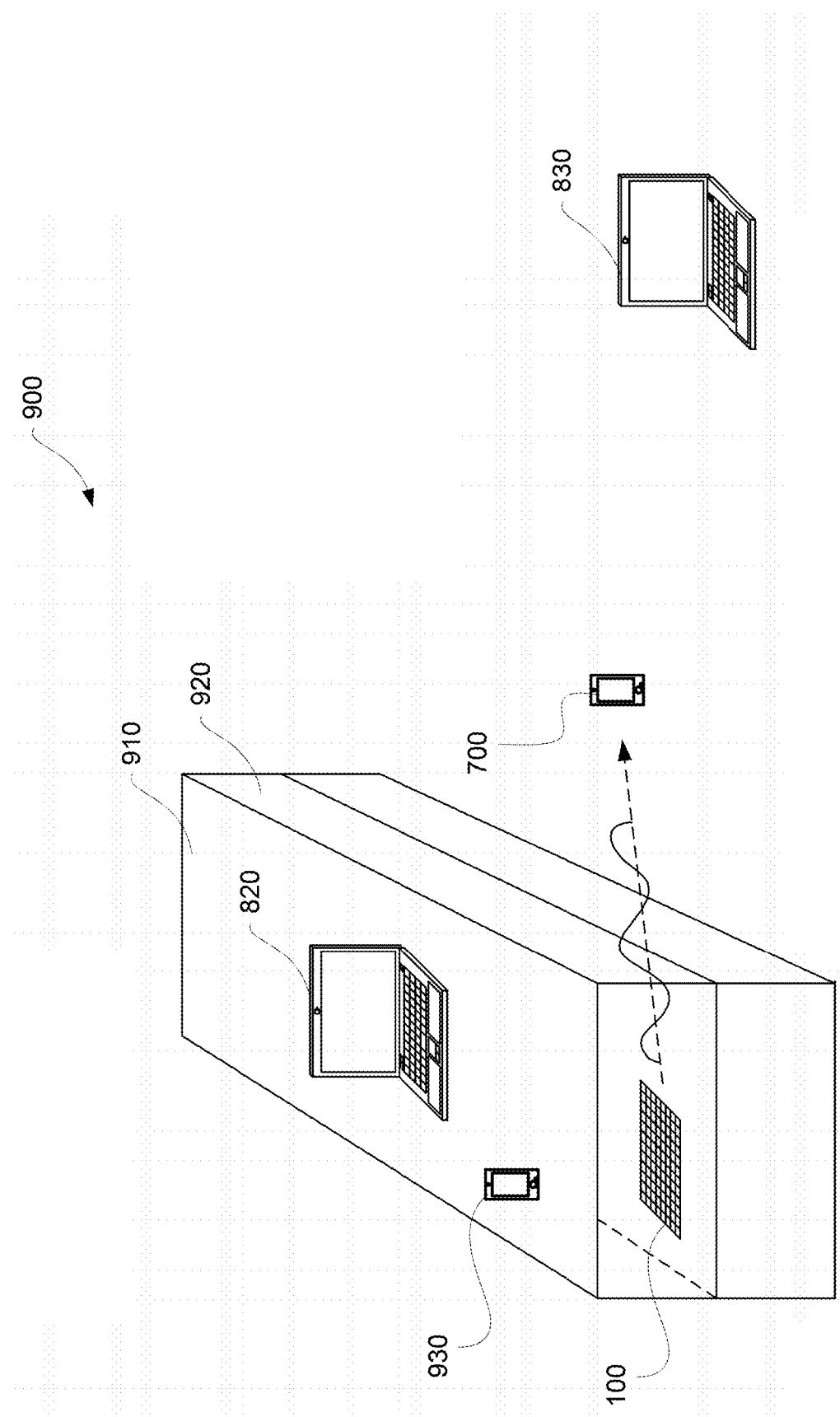

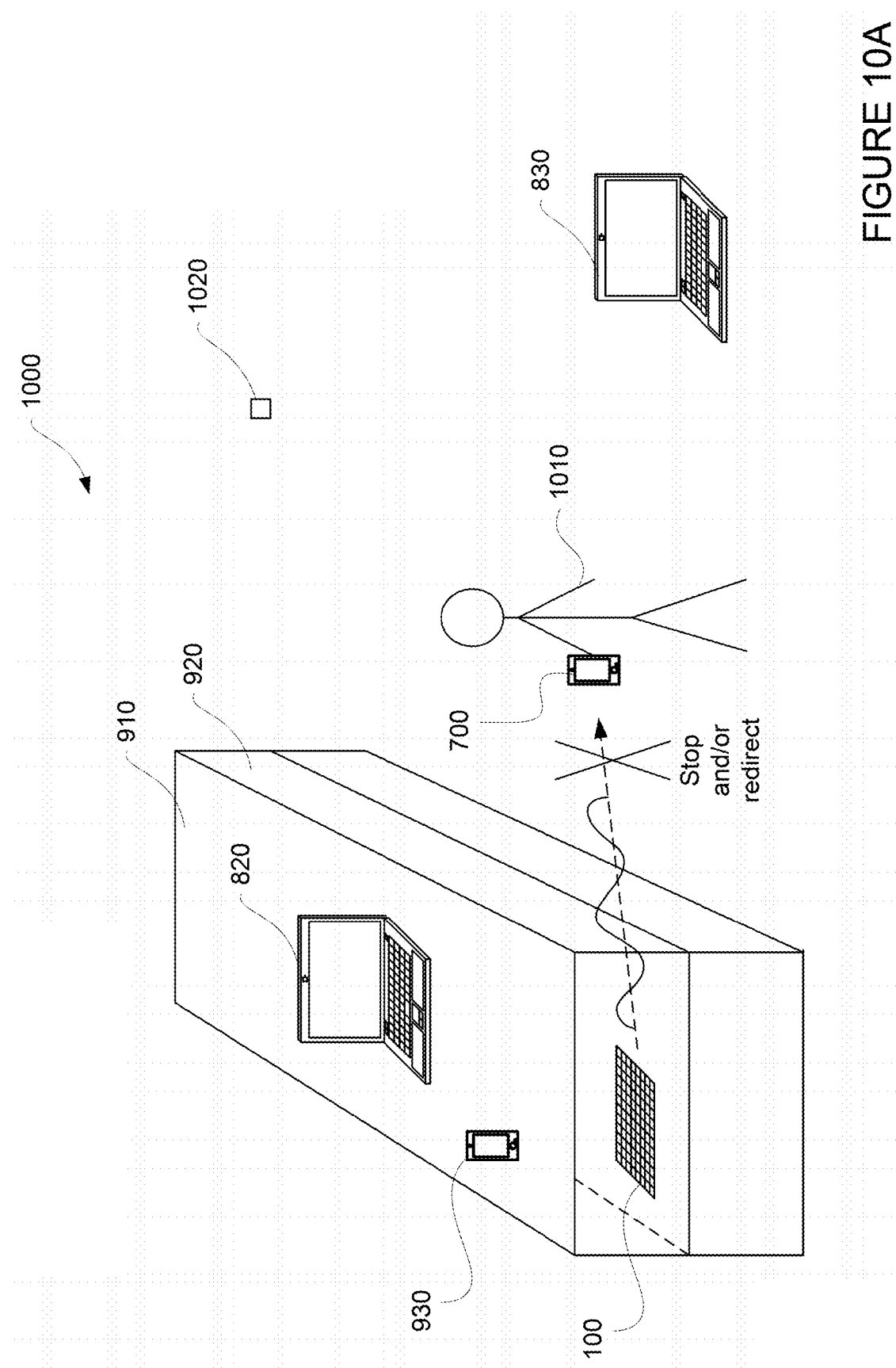

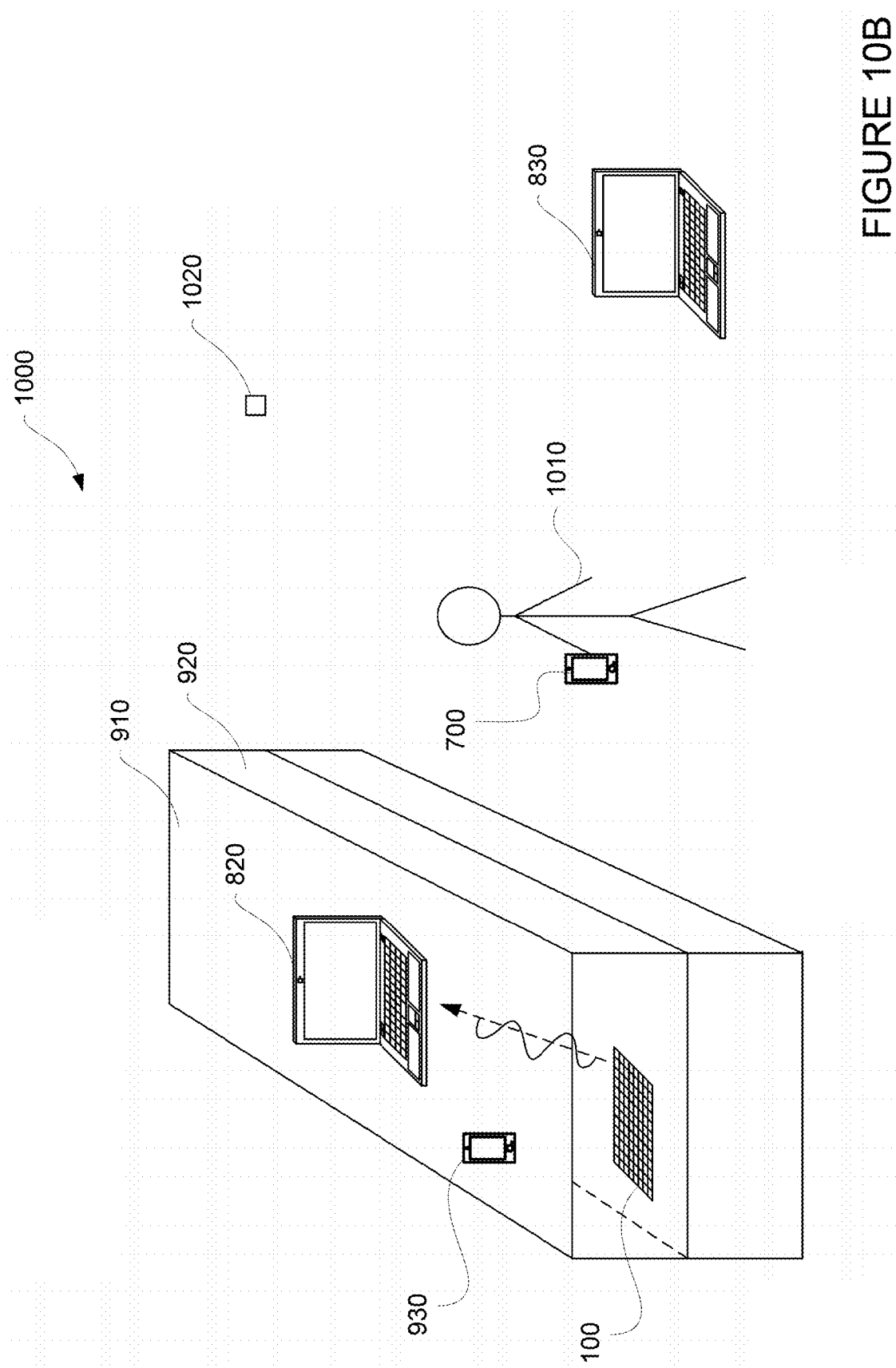

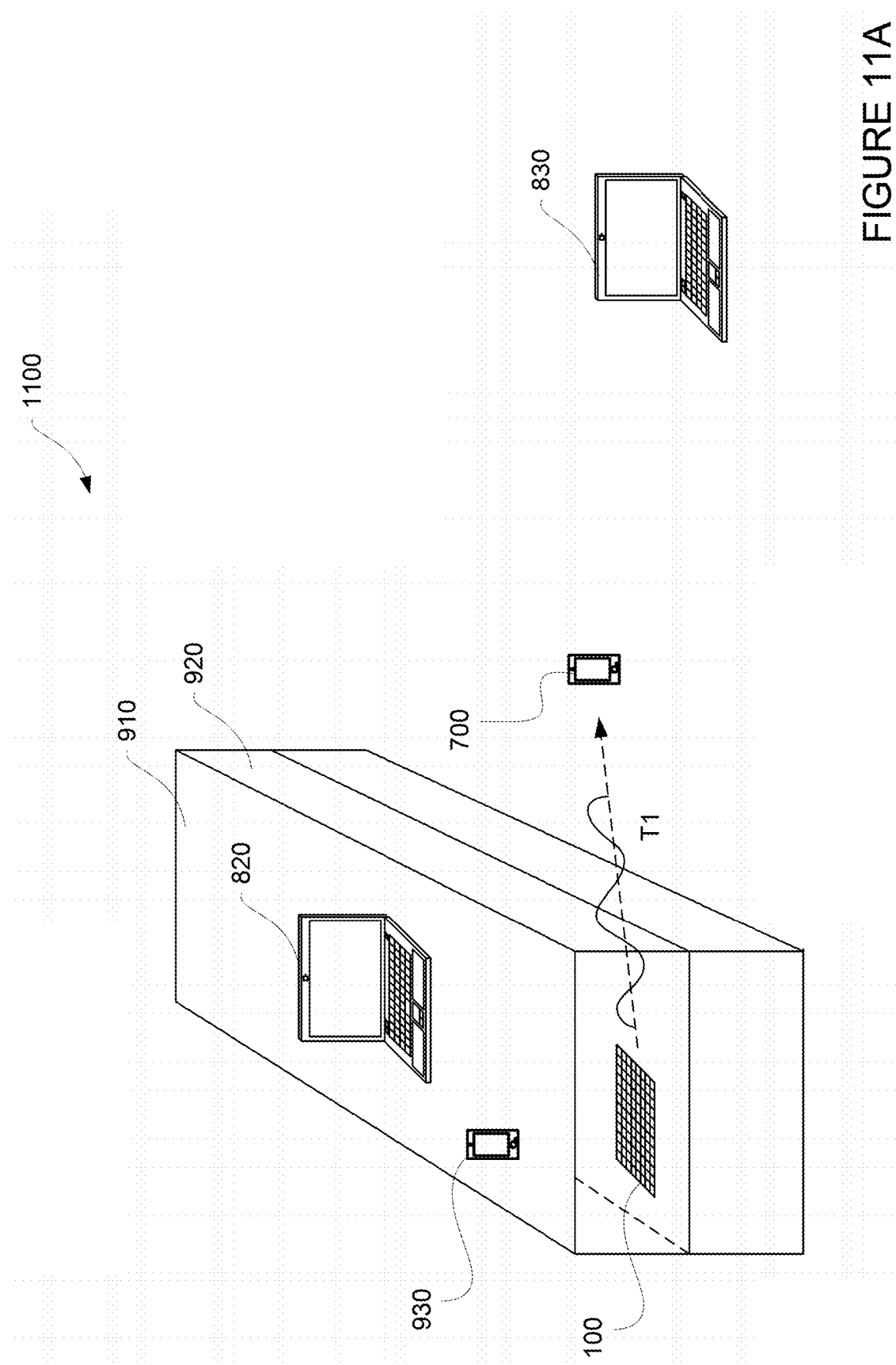

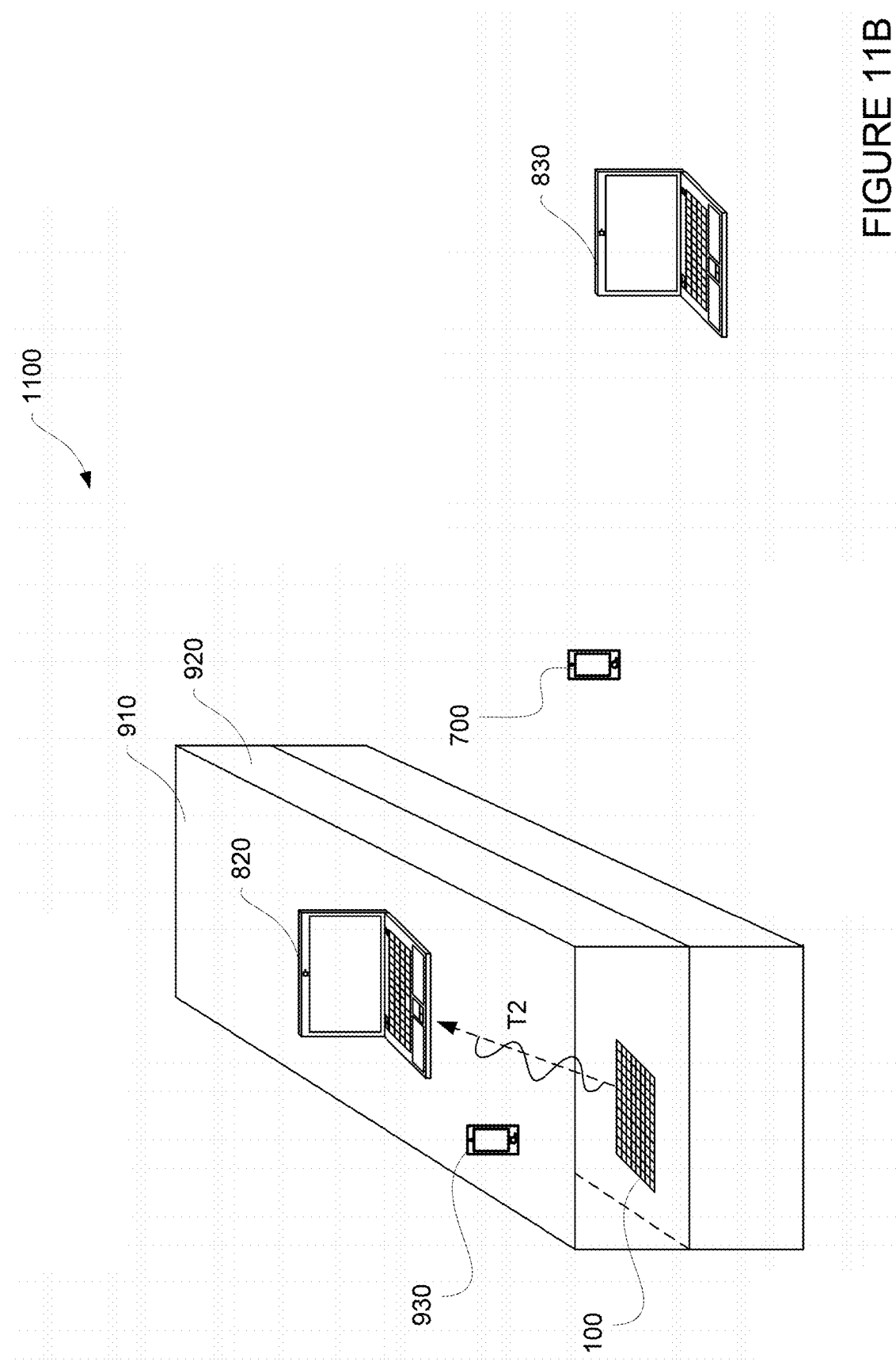

RADIATIVE WIRELESS CHARGING SYSTEM

CROSS-REFERENCE TO RELATED APPLICATIONS

This application claims the benefit of the filing date of U.S. Provisional Patent Application No. 62/872,854 filed Jul. 11, 2019, the disclosure of which is hereby incorporated herein by reference.

BACKGROUND

Charging of electronic devices is usually accomplished by plugging devices into a power outlet via charging accessories, such as a charging cable or a holder with contacts. As such, the electronic devices may be required to remain in the vicinity of the outlet, and the number of charging accessories required may scale up with an increasing number of electronic devices that need to be simultaneously charged.

A wireless charger may provide power to a wirelessly charged device without requiring a conductive connection, such as a contact or a wire, between the wireless charger and the wirelessly charged device. For example, an inductive charger may be provided with a transmitter coil for inductively transmitting energy, and the wirelessly charged device may be provided with a receiver coil for inductively receiving the transmitted energy. However, charging efficiency may degrade rapidly with misalignment between the transmitter coil and the receiver coil, yet aligning the two coils may not be easy. Further, the number of transmitter coils required in the inductive charger may scale with the number of electronic devices that need to be simultaneously charged. As another example, a wireless charger may be provided with a transmitter antenna for transmitting beams of electromagnetic energy, and the wirelessly charged device may be provided with an antenna for receiving the transmitted energy. However, complex beamforming may be required to achieve a satisfactory charging efficiency, as well as meeting FCC's safety requirements.

BRIEF SUMMARY

The present disclosure provides for a wireless charger comprising a transmitter antenna array including a plurality of radiating elements, one or more detectors configured to collect signals from receiver antennas, one or more sensors configured to generate signals indicating presence of a person, and one or more processors. The one or more processors are configured to determine, based on the signals from the one or more detectors, that one or more of the receiver antennas are located within a near-field range of the transmitter antenna array; control the plurality of radiating elements to focus electromagnetic waves on a first receiver antenna of the one or more receiver antennas; control the transmitter antenna array to transmit power to the first receiver antenna; determine, based on the signals from the one or more sensors, that a person is located within the near-field range of the transmitter antenna array; and control the transmitter antenna array to stop transmitting power to the first receiver antenna.

The one or more processors may be further configured to determine, based on the signals from the one or more detectors and the signals from the one or more sensors, whether the person is located in a direction of the power transmission, wherein controlling the transmitter antenna array to stop transmitting power to the first receiver antenna is further based on determining that the detected person is located in the direction of the power transmission. The one or more processors may be further configured to determine, based on the signals from the one or more detectors and the signals from the one or more sensors, that the person is not located in a direction of a second receiver antenna of the one or more receiver antennas; control the plurality of radiating elements to focus electromagnetic waves on the second receiver antenna; and control the transmitter antenna array to transmit power to the second receiver antenna.

The one or more sensors may include at least one of: an optical sensor, a camera, a motion sensor, a radar, or an RF sensor.

An operating frequency of the transmitter antenna array may be outside frequency ranges for wireless communication. The operating frequency of the transmitter antenna array may be 24 GHz.

Dimensions of the transmitter antenna array may be within a range of 10 cm-20 cm. Spacings between the plurality of radiating elements may be within a range of 0.5 cm-1 cm.

The plurality of radiating elements may be provided on a two-dimensional surface. The plurality of radiating elements may be provided on one or more surfaces of a three-dimensional structure.

A boundary of the near-field range may be between 0.5-2 meter.

The wireless charger may further comprise one or more phase shifters configured to change phases of the electromagnetic waves from the plurality of radiating elements, wherein the one or more processors are further configured to control the one or more phase shifters to focus the electromagnetic waves on the first receiver antenna.

The wireless charger may further comprise one or more amplifiers configured to change amplitudes of the electromagnetic waves from the plurality of radiating elements, wherein the one or more processors are configured to control the one or more amplifiers to focus the electromagnetic waves on the first receiver antenna.

The one or more detectors may be further configured to receive measurements of power received by the first receiver antenna through a Bluetooth link, wherein the one or more processors are further configured to control the plurality of radiating elements to focus the electromagnetic waves on the first receiver antenna based on the measurements of power received.

The one or more processors may be further configured to determine, based on the signals from the one or more detectors, that the one or more receiver antennas include a plurality of receiver antennas; determine a time division to focus the electromagnetic waves and transmit power to each of the plurality of receiver antennas.

The present disclosure further provides for an antenna system comprising: a transmitter antenna array comprising a plurality of radiating elements, the transmitter antenna array having an operating frequency higher than frequency ranges for wireless communication; and one or more receiver antenna arrays each comprising a plurality of radiating elements, the one or more receiver antenna arrays being located within a near-field range of the transmitter antenna array.

The antenna system may further comprise one or more rectifier configured to convert RF received by the one or more receiver antenna arrays into electrical energy; and one or more energy storage units configured to store the electrical energy.

The antenna system may further comprise one or more feedback devices configured to: generate measurements on power received by the one or more receiver antenna arrays; send the measurements to one or more processors associated with the transmitter antenna array through a Bluetooth link.

A boundary of the near-field range of the transmitter antenna array may be at 0.5-2 meter.

The present disclosure still further provides for an antenna array comprising a plurality of antenna radiating elements; wherein an operating frequency of the antenna array is higher than frequency ranges for wireless communication; and wherein a near-field range of the transmitter antenna array is between 0.5-2 meter.

DESCRIPTION OF THE DRAWINGS

FIG. 9 illustrates an example scenario of wireless charging in accordance with aspects of the disclosure.

FIGS. 10A and 10B illustrates an example scenarios of wireless charging when a person is detected in accordance with aspects of the disclosure.

FIGS. 11A and 11B illustrates an example scenario of wireless charging using a time division scheme in accordance with aspects of the disclosure.

DETAILED DESCRIPTION

Overview

Figure 1:
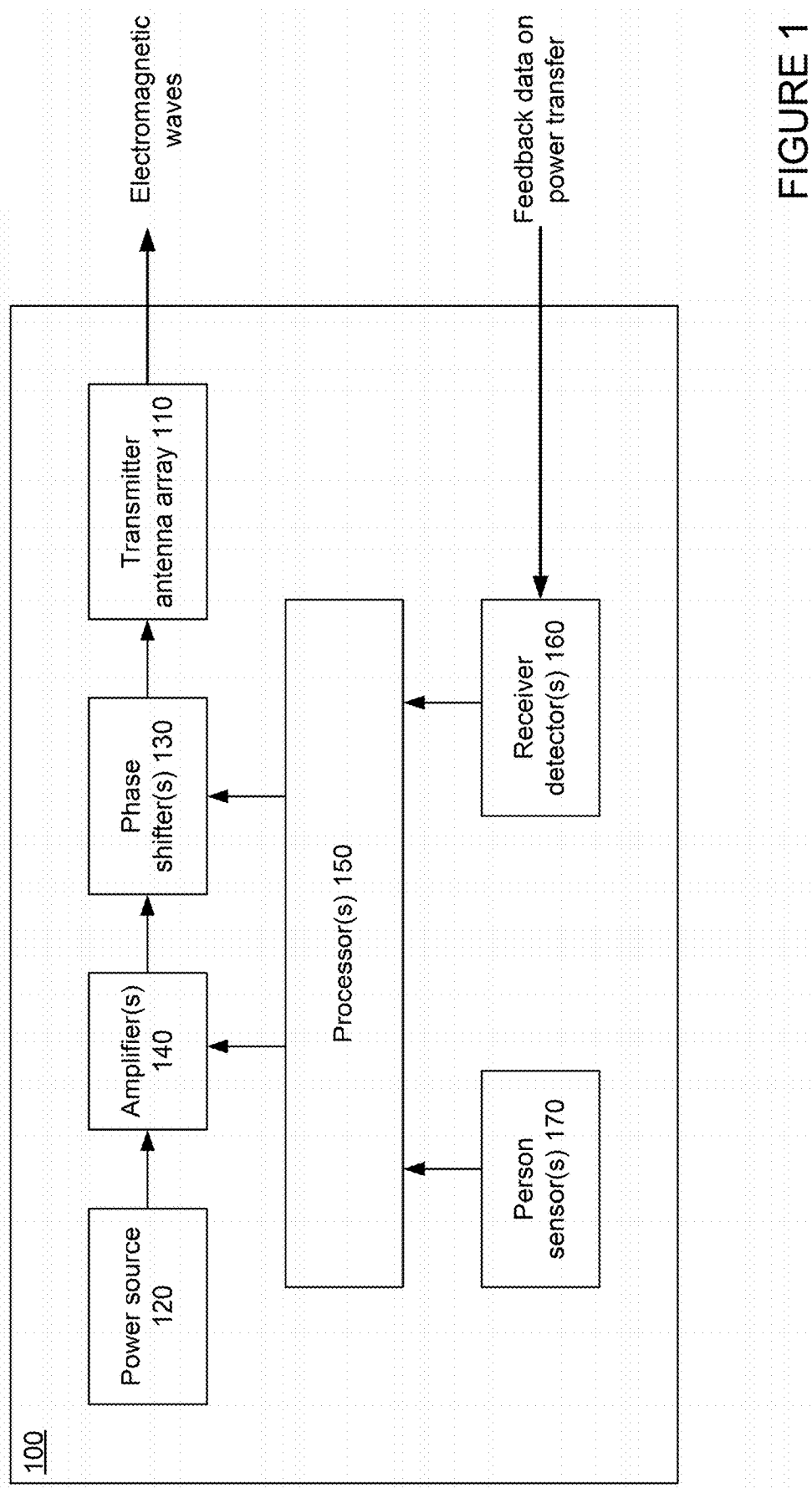
FIG. 1 is a block diagram of an example wireless charger in accordance with aspects of the disclosure.

The technology generally relates to wireless charging. In this regard, a wireless charger may be provided with a transmitter antenna array, one or more detectors, one or more sensors, and one or more processors. The transmitter antenna array may include a plurality of radiating elements configured to transmit power via electromagnetic waves. The detectors may be configured to collect signals from devices that can be wirelessly charged that are located within a vicinity of the wireless charger. The sensors may be configured to collect signals indicating presence of persons located within a vicinity of the wireless charger. The processors may be configured to detect devices and persons in the vicinity of the wireless charger based on the signals from the detectors and the sensors. Based on the detections, the processors may be configured to control the transmitter antenna array to focus electromagnetic waves in one or more beams to charge the detected devices, as well as to avoid transmitting the electromagnetic waves to the detected persons.

The wireless charger may be configured to focus electromagnetic waves within a near-field region of the transmitter antenna array. In this regard, one or more phase shifters and/or one or more amplifiers may control the plurality of radiating elements so that electromagnetic waves transmitted by the plurality of radiating elements constructively interfere to focus on a detected device located within the near-field region of the transmitter antenna array.

Parameters of the wireless charger may be selected based on practical considerations. For example, dimensions of the wireless charger may be selected so that the wireless charger can be conveniently positioned in a room in a residence or an office, such as on or inside furniture. As another example, dimensions and operating frequency of the wireless charger may be selected so that the near-field region is large enough to include multiple devices in a room, but not so large to include devices not intended to be charged. In some instances, the transmitter antenna array may be configured to have an operating frequency outside of frequency ranges for wireless communication. For example, the operating frequency may be significantly higher than frequency ranges for wireless communication, such as 24 GHz.

The wireless charger may be configured to avoid transmitting radiation to persons in the vicinity. For instance, if a person is detected, processors may control the wireless charger to stop charging. Alternatively, the wireless charger may stop charging only if the detected person is within the near-field region of the transmitter antenna array, and/or if the detected person is located in a direction of the power transmission. In such instances, the wireless charger may instead focus the electromagnetic waves to charge another detected device, such as one that is not in the direction of the detected person.

The wireless charger may be configured to charge multiple devices using a time division scheme. In one example time division scheme, the wireless charger may charge a first detected device until it is fully charged, then charge a second detected device, and so on. In another example time division scheme, the wireless charger may charge each of the multiple devices for a fixed period of time, such as a few minutes, and rotate between the multiple devices until all are fully charged. Alternatively or additionally, the wireless charger may be configured to generate multiple beams of electromagnetic waves to simultaneously charge multiple devices.

The technology is advantageous because it provides for efficient wireless charging. The technology described herein allows a high level of power to be transferred in the near-field region, and at the same time allow the power to quickly attenuate to a low level in the far-field region. This enables efficient power transfer to devices within the near-field region, as well as reduces interference with devices in the far-field region. By automatically focusing electromagnetic waves on detected devices, a user does not need to manually plug in the device to be charged, or align a coil in the device to a coil in a charger. By adjusting operating frequency and other parameters of the wireless charger, the wireless charger may be designed to conveniently fit in everyday environments, such as on or inside furniture, and to charge devices within distances common in practical situations, such as within one or meters or so in a room of a residence or office. By using an operating frequency outside of wireless communication ranges, the wireless charger may be able to increase level of power transfer without causing interference with other devices. Aspects of the technology further provide for a detection mechanism to avoid transmitting radiation to persons near the wireless charger. The technology further provides for time division for charging multiple devices without requiring extra accessories such as wires, coils, etc.

Example Systems

FIG. 1 shows a block diagram of an example wireless charger 100. As shown, the wireless charger 100 includes a transmitter antenna array 110, a power source 120, one or more phase sifters 130, one or more amplifiers 140, one or more processors 150, one or more receiver detectors 160, and one or more person detectors 170, each of are described in detail below. For instance, the power source 120 may generate electromagnetic waves, such as radiofrequency (RF) waves, to be transmitted by the transmitter antenna array 110. The transmitted electromagnetic waves may be used to provide power to devices in a vicinity of the wireless charger 100. In this regard, the operating frequency may be selected to increase power transfer efficiency. For example as described below, the electromagnetic waves generated by the power source 120 may have any operating frequency, including frequencies not in ranges allocated for wireless communication. In addition to selecting an operating frequency to increase power transfer efficiency, an operating frequency may be selected outside of ranges allocated for wireless communication so that waves transmitted by the wireless charger 100 would not interfere with wireless communication of other devices.

Figure 2A:
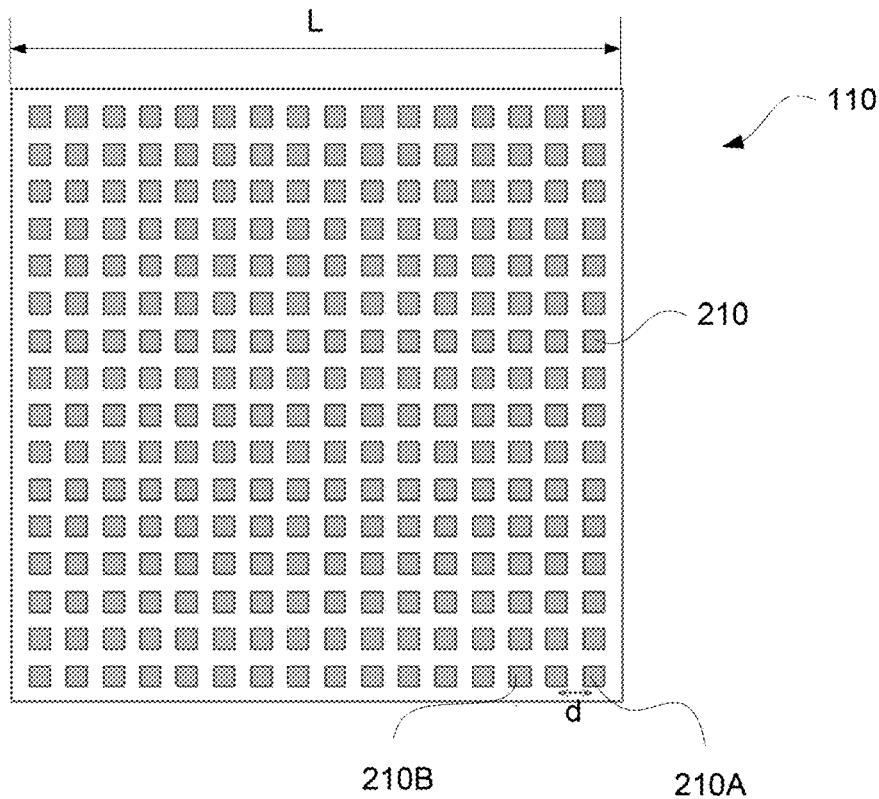
FIGS. 2A and 2B are pictorial diagrams illustrating an example transmitter antenna array in accordance with aspects of the disclosure.
Figure 2B:
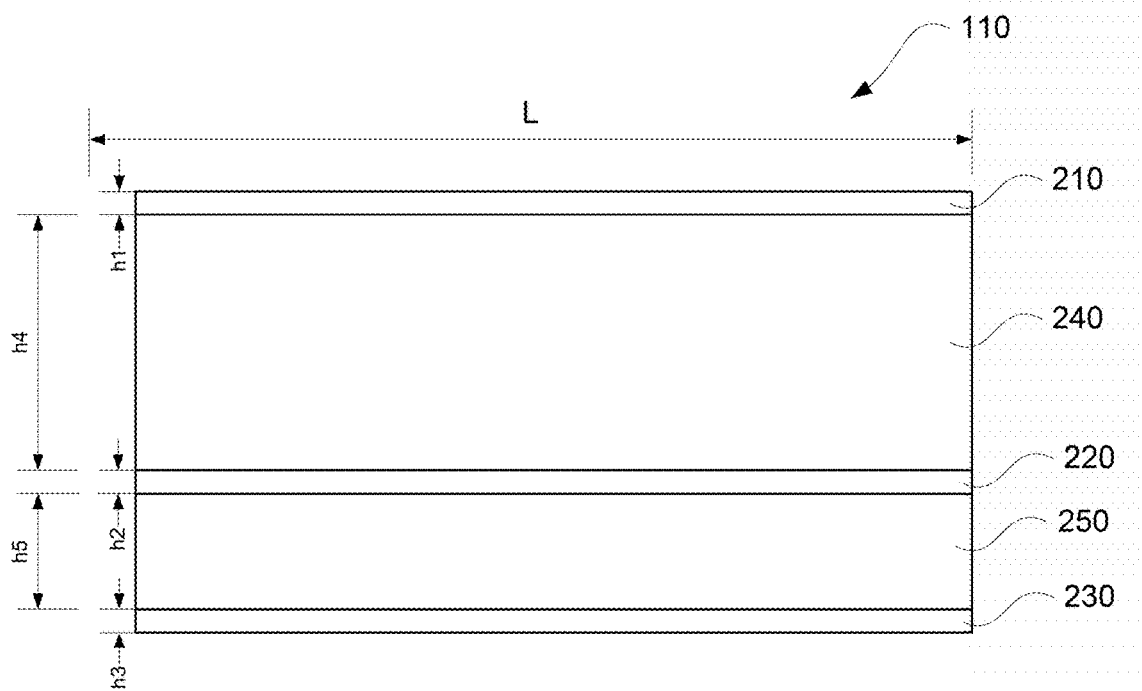

FIGS. 2A and 2B illustrate an example transmitter antenna array, such as the transmitter antenna array 110 in wireless charger 100 of FIG. 1. FIG. 2A is a top view of the transmitter antenna array 110 and FIG. 2B is a side view of a cross section of the transmitter antenna array 110.

Referring to FIG. 2A, the transmitter antenna array 110 is shown to have a two-dimensional, planar top surface on which a plurality of radiating elements 210, such as 210A, 210B, etc., are provided. Although the planar top surface of the transmitter antenna array 110 is shown as a square with a length of L, the transmitter antenna array 110 may be of another shape. For example, the transmitter antenna array 110 may have a planar top surface that is a circle, an oval, a rectangle, a polygon, etc. Further, the transmitter antenna array 110 may have a three-dimensional structure, such as a cube, a sphere, a prism, etc., and the plurality of radiating elements may be provided on one or more surfaces of the three-dimensional structure.

In some examples, dimensions of the transmitter antenna array 110 may be less than 50 cm, or within a range from 10 cm-20 cm. As such, wireless charger 100 including the transmitter antenna array 110 may be conveniently positioned in a typical room in a residence or an office. For instance, the wireless charger 100 including the transmitter antenna array 110 may be positioned in a drawer in an office desk, or on top of a nightstand. As another example, the wireless charger 100 may be integrated in smart home products. Although various example dimensions of the transmitter antenna array 110 and its various components are described herein, dimensions of the transmitter antenna array 110 and its various components may be selected based on an operating frequency of the transmitter antenna array 110, and may have large variances depending on the operating frequency. Alternatively, the operating frequency of the transmitter antenna array 110 may be selected based on desired dimensions for the transmitter antenna array 110 and its various components, such as for optimal power transmission within a desired distance, manufacturing ease, health and safety regulations, etc.

The radiating elements 210 of the transmitter antenna array 110 are configured to support currents or fields that contribute directly to the radiation patterns of the transmitter antenna array 110. In this regard, the radiating elements 210 may be made of any of a number of conductive materials, such as metals and alloys. The radiating elements 210 may each have a square shape as shown, or alternatively have any other shape, such as rectangular, oval, square, polygon, etc. The radiating elements 210 are shown to have spacings of a distance "d" between one another. In the example above where the transmitter antenna array 110 has dimensions within a range of 10 cm-20 cm, spacing d may be within a range of 5 mm-10 mm Although FIG. 2A shows 16×16 radiating elements 210 on the transmitter antenna array 110 arranged with equal spacings d, any other number of radiating elements may be provided, in any type of arrangements. For example, irregular spacings between the radiating elements may be used. As another example, the spacings may be relatively large compared to the dimensions of the radiating elements such that the radiating elements are sparsely arranged in the transmitter antenna array.

Referring to FIG. 2B, the transmitter antenna array 110 may include other features typically found in an antenna or antenna array. For example, the transmitter antenna array 110 may include a ground plane 220 for the radiating elements 210. The ground plane 220 may be made of any of a number of conductive materials, such as metals and alloys. A ground plane is a conducting surface that serves as a reflecting surface for radio waves received and/or transmitted by the radiating elements of an antenna. As shown, the ground plane 220 may be provided in a layer below the top surface of the transmitter antenna array 110. Although the ground plane 220 is shown having a similar shape and dimensions as the top surface of the transmitter antenna array 110, in other examples the ground plane 220 may have other shapes and dimensions.

The transmitter antenna array 110 may further include one or more feeds 230. The feeds 230 may be connected to transceivers and/or radio sources. For instance, the feeds 230 may be configured to feed radio waves from a radio source (such as the power source 120 configured to generate electromagnetic waves), via a transceiver, to the rest of the transmitter antenna array 110 including the radiating elements 210. In some examples, the transmitter antenna array 110 may be capacitively fed by feed structures (not shown) positioned proximate to the feeds 230. Where there are multiple feeds 230, the feeds 230 may be provided as a feed network. In the example shown with 16×16 radiating elements 210, the feeds 230 may be arranged in a corresponding 16×16 array of feeds in a layer below the top surface. Alternatively, the feeds 230 may be provided in a layer with other shapes, dimensions, and/or arrangements.

The transmitter antenna array 110 may be considered as including a plurality of patch antennas. For instance, each individual radiating element of the radiating elements 210, a corresponding feed in the feed network 230, and the ground plane 220, may together form a single patch antenna. A patch antenna is an antenna whose radiating element has a small thickness (or planar) that can be mounted on a flat surface. For example as shown, the radiating elements 210 may have a relatively small thickness of h1, which may be 0.01-0.2 mm. The ground plane 220 may be provided in a layer with a relatively small thickness of h2, which may be 0.01-0.2 mm. The feeds 230 may be provided in a layer with a relatively small thickness of h3, which may be 0.01-0.2 mm Although these example thicknesses may be typical for an antenna implemented on a Printed Circuit Board (PCB), in other examples the layers may have other thicknesses.

Further as shown in FIG. 2B, one or more separation layers, such as separation layers 240 and 250, may provide insulation between the radiating elements 210, the ground plane 220, and the feeds 230. The separation layers 240, 250 may each be made of a dielectric material, such as a plastic, a polymer, a glass, a ceramic, etc. The separation layers 240, 250 may further provide mechanical support to the radiating elements 210, ground plane 220, and feeds 230. As such, the separation layers may have a relatively larger thickness of h4 and h5, which for example may be 1 mm-3 mm. Although only two separation layers 240, 250 are shown, the transmitter antenna array 110 may include additional layers, for example an additional layer may be provided on top of radiating elements 210 or below feeds 230 for protecting the radiating elements 210 and/or feeds 230.

Figure 3:
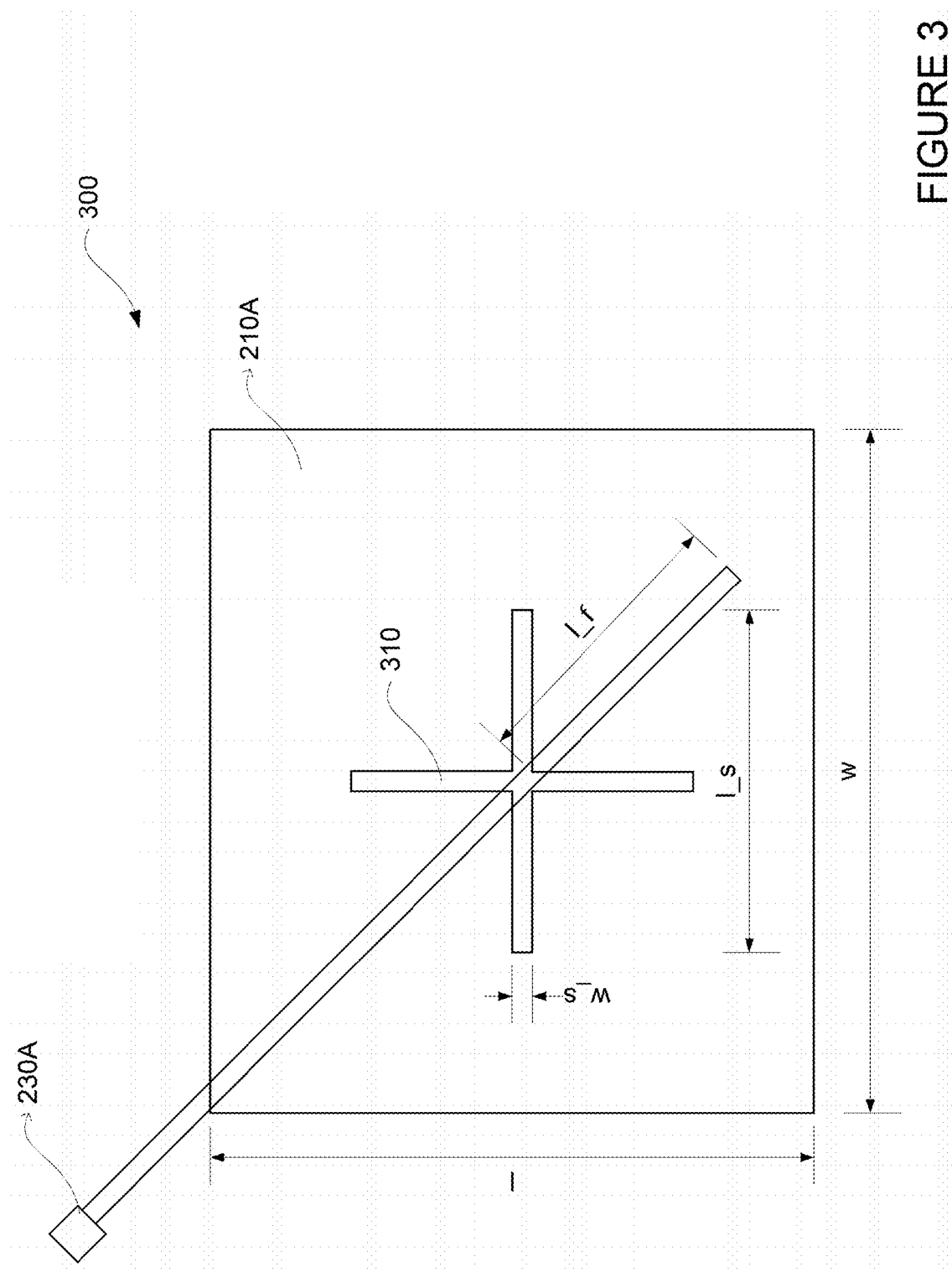
FIG. 3 illustrates an example patch antenna in accordance with aspects of the disclosure.

FIG. 3 shows an example patch antenna 300 that includes the radiating element 210A of FIG. 2A. For instance, the radiating element 210A is shown to have a width w and a length l. In the above example of a 10 cm-20 cm 16×16 array, the dimensions of a radiating element (such as w and l) may be within a range of 0.1 mm-10 mm. As mentioned above, the dimensions may vary depending on many factors, such as operating frequency, characteristics of the layers 240, 250, etc. The patch antenna 300 may be circularly polarized, which means that the patch antenna is configured to transmit electromagnetic wave whose electric field rotates in a plane perpendicular to a direction of transmission. Circular polarization allow the electromagnetic waves transmitted by the patch antenna 300 (and the transmitter antenna array 110) to be received by a receiver antenna regardless of the orientation of the receiver antenna.

The patch antenna 300 may be aperture-fed. For example as shown, an aperture, such as cross slot 310, may be provided in the ground layer 220, thus creating an opening in the ground layer 220 that does not include conductive materials. The cross slot 310 may have any dimensions "w_s" and "l_s," which may be selected for desired radiation characteristics. The cross slot 310 may be configured to generate circular polarization, alternatively, other types of apertures or other components may be configured to generate circular polarization. Electromagnetic waves from a feed, such as feed 230A among feeds 230, may be transmitted through the cross slot 310 to the radiating element 210A. The feed 230A may have a length "l_f" past the center of the cross slot 310, which may be selected for desired radiation characteristics. Since the feed 230A and the radiating element 210A are decoupled by the ground plane 220, and as such, characteristics of the separation layer 240 may be selected to optimize the radiating element 210A, while characteristics of the separation layer 250 may be selected to optimize feed 230A. Further, if other components (such as power source 120, phase shifters 130, amplifiers 140, etc.) are incorporated in the same layer as the feeds 230 or in another layer, these other components would not affect the radiating element 210A. The patch antenna 300 may be a monopole antenna, a dipole antenna, a slot antenna, a hybrid antenna, a loop antenna, an inverted-F antenna, etc.

Returning to FIG. 1, to adjust aspects of power transmission by the transmitter antenna array 110, the wireless charger 100 may further include one or more phase shifters 130 and one or more amplifiers 140. The phase shifters 130 and/or the amplifiers 140 may be configured to adjust the transmitter antenna array 110 so that the electromagnetic waves from the radiating elements 210 form into one or more beams for power transmission. For instance, to adjust the direction of power transmission, the phase shifters 130 may change the phases of the electromagnetic waves transmitted by the transmitter antenna array 110. Example of phase shifters may include delay lines, varactors, and filters. Further, to adjust the amount of power transmission, the amplifiers 140 may change the amplitudes of the electromagnetic waves transmitted by the transmitter antenna array 110. The phase shifters 130 and the amplifiers 140 may be configured to perform beamforming for the transmitter antenna array 110. The phase shifters 130 and amplifiers 140 may adjust the power transmission in any order of operation.

Figure 4:
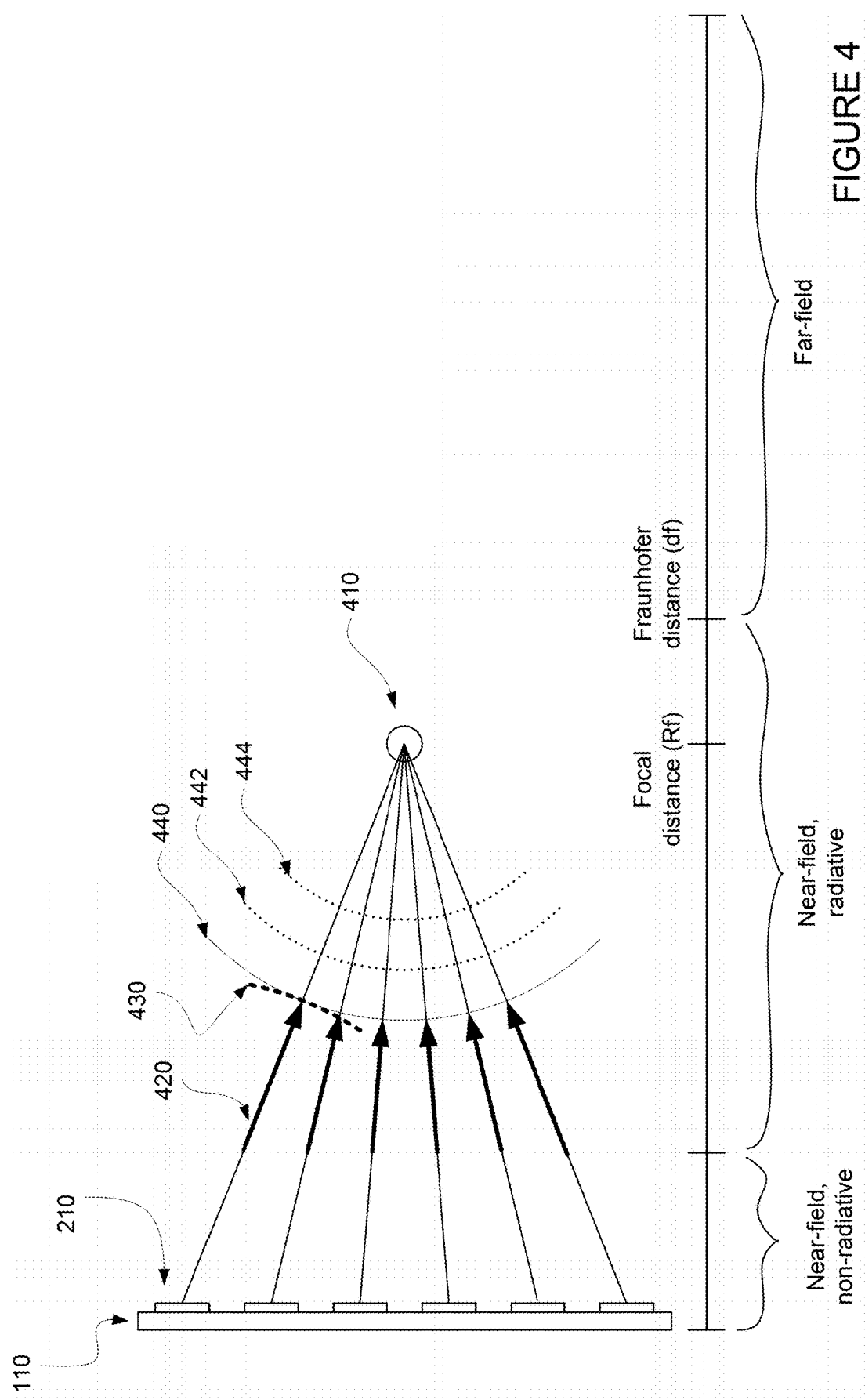
FIG. 4 illustrates an example near-field focused antenna array in accordance with aspects of the disclosure.

In this regard, FIG. 4 illustrates beamforming in a near-field range of an antenna array, such as transmitter antenna array 110. When an antenna (or antenna array) transmits (or receives) electromagnetic waves, the region containing the electromagnetic field may be divided into a near-field region near the antenna, and a far-field region at greater distances from the antenna. The boundary between the near-field region and the far-field region an antenna, referred to as the Fraunhofer distance (de, may depend on dimensions of the antenna's radiating element and the antenna's operating frequency. For example, for a given antenna dimension, the greater the operating frequency (or lower the wavelength), the farther the boundary is from the antenna. Further, an antenna's natural focal point is located within the near-field region near this boundary. The focal point is where power density for received and/or transmitted radiation of the antenna is maximized.

Characteristics of the electromagnetic field within the near-field region are different from those of the far-field. For example, in the far-field, field strength decreases inversely with distance from the antenna according to the Friis equation. In contrast, field strength in the near-field region changes more rapidly with distance from the antenna. For instance, in the non-radiative near-field region or reactive region, field strengths may fluctuate rapidly due to complex interactions between electric and magnetic fields. In contrast, field strengths may be more predictable in the radiative near-field region or Fresnel region because the distance is large enough such that there is no longer reactive components of electromagnetic waves. Thus in the radiative near-field region, electromagnetic waves from a transmitting antenna are radiated outwards.

Referring to the example shown in FIG. 4, the transmitter antenna array 110 may have a focal point 410. The Fraunhofer distance "df" for the transmitter antenna array 110 may be determined based on a relationship df=2 $L^2/\lambda$, where L is the largest dimension of antenna or antenna array, and $\lambda$ is the wavelength corresponding to the operating frequency. As shown, the focal distance Rf is within the Fraunhofer distance df. The focal distance Rf is determined based on phase relationship between the signals from the feeds 230 that feed the radiating elements 210. By adjusting the signals of the feeds 230, the focal distance Rf may be adjusted to a desired distance, such as a typical distance between a desk in a room and devices likely in the room. By focusing or beamforming within the radiative near-field region, in particular in areas near the focal point 410 where power density is maximized, the transmitter antenna array 110 may achieve greater power transfer efficiency than, for example, beamforming in the far-field region or the non-radiative near-field region.

In order to focus or beamform within the radiative near-field region, phases and/or amplitudes of the electromagnetic waves from the transmitter antenna array 110 may be adjusted. For example, phase shifters 130 may change the phases of electromagnetic waves 420 transmitted from each of the radiating elements 210 in the transmitter antenna array 110 so that wavefronts 430 from each of the radiating elements 210 form equiphase surfaces, such as surfaces 440, 442, 444. As shown, these equiphase surfaces may be concentric to the focal point 410. Further, since a beam of electromagnetic waves may include a main lobe centered about a focal spot and secondary lobes around the main lobe, amplifiers 140 may change amplitudes of the electromagnetic waves 420 transmitted from each of the radiating elements 210 to reduce levels of secondary lobes in the resulting radiation pattern.

Further as shown, because each of the radiating elements 210 is located at a different position relative to the focal point 410 (and also the surfaces 440, 442, 444), near-field focusing may require a different phase for each of the radiating elements 210 depending on the distance and relative direction between a particular radiating element and the focal point 410. In this regard, one example beamforming approach is called the conjugate phase approach, where the phases are adjusted to compensate for phase delay introduced by the path between the radiating elements and the focal point, resulting in constructive interference. Other example approaches include optimization-based approaches, which may include changing any of a number of antenna parameters (e.g., dimensions, materials) and configurations (e.g., unequal spacings between radiating elements) in order to generate focused beams.

Figure 5:
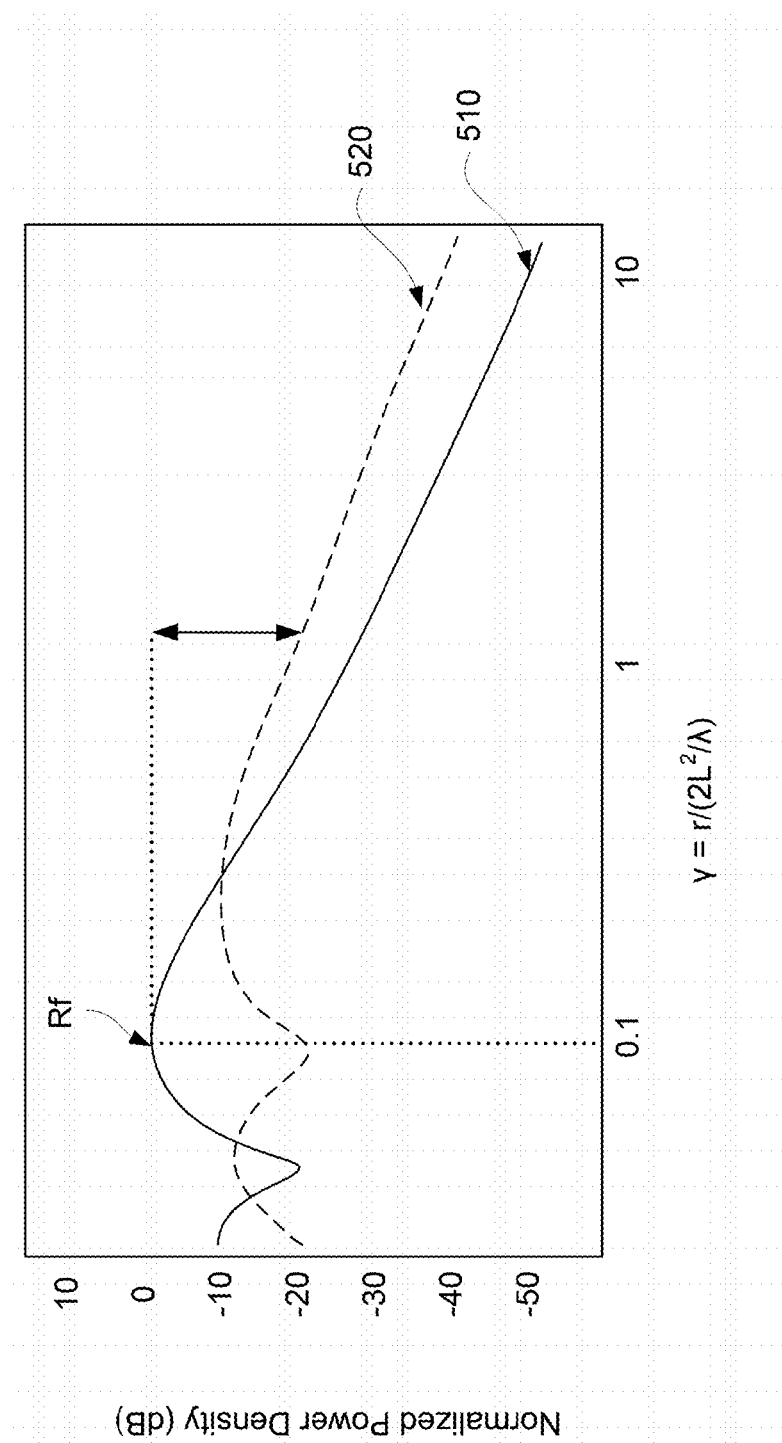
FIG. 5 is a graph illustrating example power transmission for a near-field focused antenna array in accordance with aspects of the disclosure.

FIG. 5 is a graph showing example comparison between power densities for a near-field focused antenna to an unfocused antenna. For example, plot 510 may represent normalized power density of the transmitter antenna array 110 when focused in the near-field region as shown in FIG. 4, while plot 520 may represent normalized power density of the transmitter antenna array 110 when not focused. The horizontal axis shows normalized distance γ from the transmitter antenna array 110, where the normalized distance is determined based on actual distance r from the transmitter antenna array 110 divided by the Fraunhofer distance df=2 $L^2/\lambda$. The vertical axis shows normalized power density, where the power density is normalized by a peak of the near-field focused beam. Here, plot 510 shows normalized power density when Rf is chosen to be 0.1 df. As shown, in the near-field region (γ<1), the near-field focused transmitter antenna array 110 may achieve higher power density than the unfocused transmitter antenna array 110, especially in the region around focal distance Rf.

Further as shown, in the far-field region (γ>1), power density for near-field focused transmitter antenna array 110 (plot 510) attenuates much faster than the unfocused transmitter antenna array 110 (plot 520). The faster attenuation may be beneficial for a number of reasons. For instance, because radiated power levels beyond the near-field attenuate rapidly with distance, the radiation will not easily interfere with other equipment.

Figure 6A:
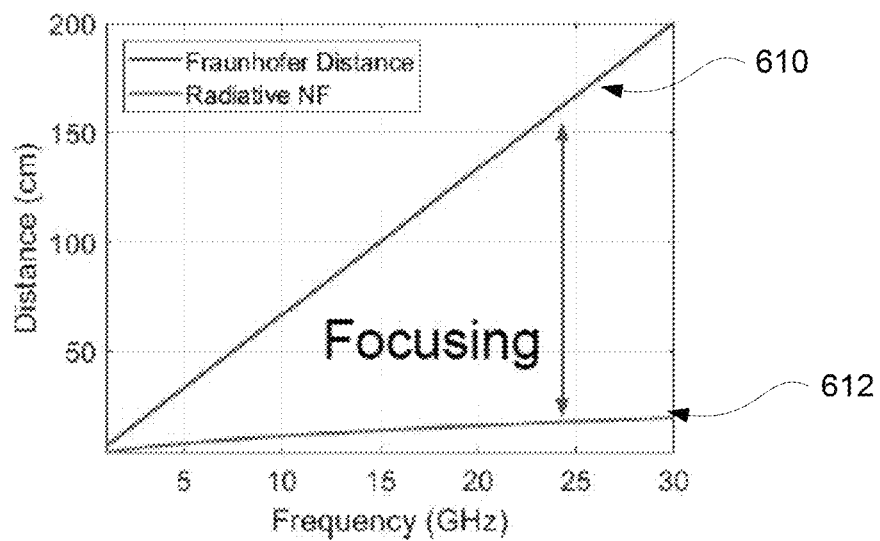
FIGS. 6A-6C are graphs illustrating example performance of various near-field focused antenna arrays in accordance with aspects of the disclosure.
Figure 6B:
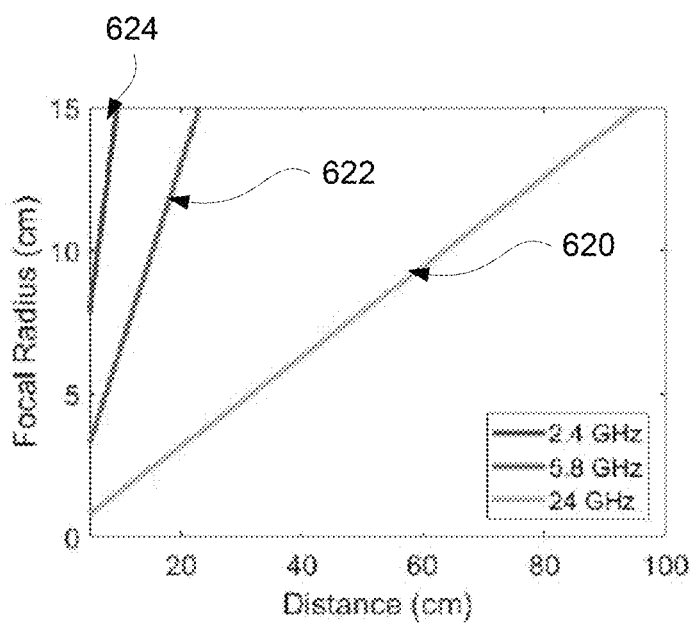
Figure 6C:
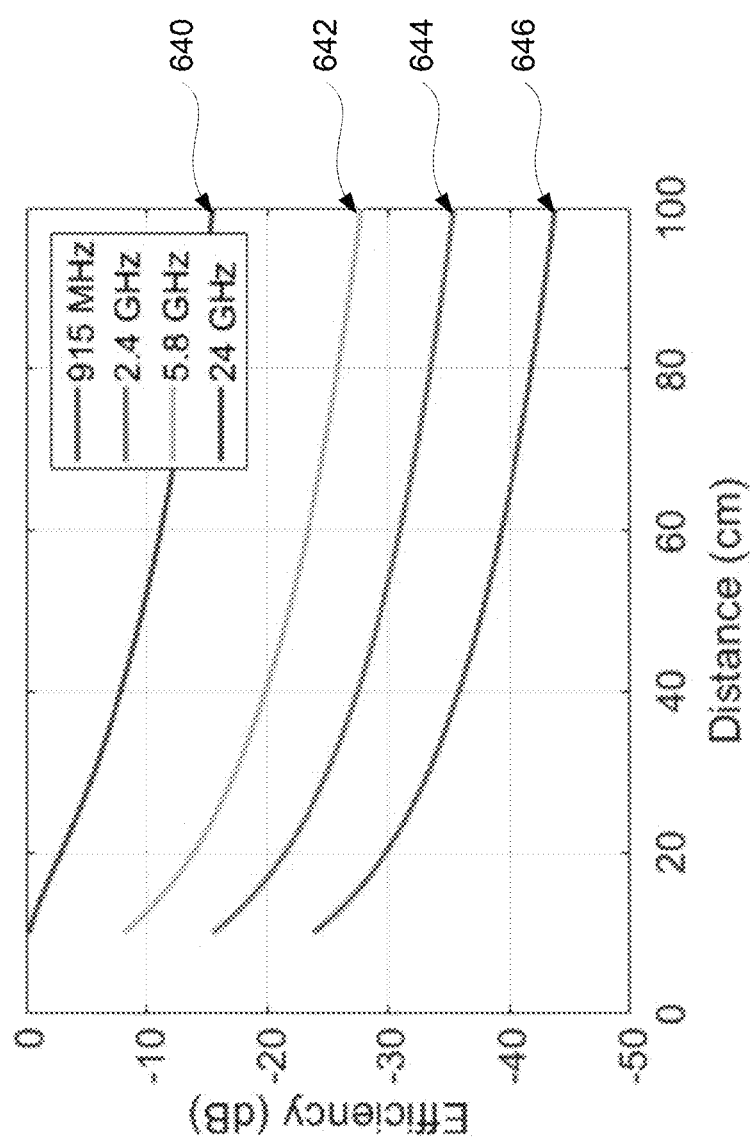

FIGS. 6A, 6B, and 6C are graphs showing example effects of various parameters on performance of the transmitter antenna array 110. In particular, each of FIGS. 6A-6C shows how operating frequency may change characteristics of the transmitter antenna array 110, as well as other effects as described below.

Referring to FIG. 6A, plot 610 shows the Fraunhofer distance df of transmitter antenna array 110 as a function of operating frequency. As shown, the Fraunhofer distance increases with operating frequency. For example as shown, at around 24 GHz, the Fraunhofer distance is about 1.6 m. Such a distance may be optimal for many situations, such as for charging various devices in one part of a room without interfering with devices in another part of the room. Further, since most wireless communication have frequency bands between 0.5 GHz-3 GHz (including Wi-Fi at 2.4 GHz), an operating frequency of 24 GHz will ensure that radiation from the transmitter antenna array 110 does not interfere with communication between other devices. Plot 612 shows the boundary between the radiative near-field region and the non-radiative near-field region of the transmitter antenna array 110 as a function of operating frequency. As described above, the transmitter antenna array 110 may be focused within the radiative near-field region before the Fraunhofer distance df. For example as shown, at the operating frequency of 24 GHz, the transmitter antenna array 110 may be focused between about 12 cm and 1.6 m.

Referring to FIG. 6B, plots 620, 622, and 624 show focal radius of the transmitter antenna array 110 at various operating frequencies. The focal radius defines a size of a focal point of the electromagnetic beam generated by the transmitter antenna array 110. For instance, like any beam of waves such as a beam of light, due to diffraction effects, the transmitter antenna array 110 may be able to focus the electromagnetic beam to a small distance relatively well (small focal point with small focal radius), but as distance increases, the transmitter antenna array 110 may not be able to focus the electromagnetic beam as well (larger focus point with larger focal radius). For example, plot 620 shows that the transmitter antenna array 110 is able to achieve a focal radius at an operating frequency of 24 GHz between 1 cm-15 cm for distances ranging from 0 to 100 cm. Plot 622 shows that the transmitter antenna array 110 is able to achieve a focal radius at an operating frequency of 5.8 GHz between 4 cm-15 cm for distances ranging from 0-20 cm. Plot 624 shows that the transmitter antenna array 110 is able to achieve a focal radius at an operating frequency of 2.4 GHz between 8 cm-15 cm for distances ranging from 0-7 cm. Thus, as the operating frequency of transmitter antenna array 110 increases, the ability of the transmitter antenna array 110 to focus the electromagnetic beam may be improved.

Referring to FIG. 6C, plots 640, 642, 644, 646 show theoretical ideal power transfer efficiency of the transmitter antenna array 110 as a function of distance at different operating frequencies. FIG. 6C illustrates effects of diffraction for a system with a transmitter antenna array and a receiver antenna array of a particular size, in particular where the transmitter antenna array 110 is 10 cm×10 cm, and the receiver is 3 cm×3 cm. In practical systems, other effects may also impact the power transfer efficiency, such as RF generation efficiency, antenna efficiency, matching efficiency, etc. For example, plot 640 shows that, at operating frequency of 24 GHz, power transfer efficiency can ideally approach 0 dB within 10 cm from the transmitter antenna array 110, and tapers off to around −15 dB at 100 cm from the transmitter antenna array 110. In contrast, plot 644 shows that, at operating frequency of 2.4 GHz, power transfer efficiency can reach only up to about −15 dB at 10 cm from the transmitter antenna array 110, and tapers off to around −35 dB at 100 cm from the transmitter antenna array 110. As such, by increasing operating frequency from 2.4 GHz (which is around the frequency range for WiFi and Bluetooth signals) to 24 GHz (which is outside of wireless communication ranges), a more than ten-fold increase in power transfer efficiency can be reached for the transmitter antenna array 110.

Returning again to FIG. 1, to determine appropriate adjustments of power transmission, the wireless charger 100 may include one or more processors 150. For instance, the processors 150 may control the phase shifters 130 and/or the amplifiers 140 to change direction and/or amplitude of electromagnetic waves from the plurality of radiating elements 210. In this regard, the processors 150 may control the phase shifters 130 and/or the amplifier based on signals from various detectors and/or sensors.

For instance as shown, the wireless charger 100 may include one or more receiver detectors 160. The receiver detectors 160 may be a tracking system including antennas and sensors configured to collect signals from devices around the wireless charger 100. For instance, the receiver detectors 160 may collect radiations transmitted by antennas of other devices, and may be configured to generate signals indicating a location of such devices relative to the wireless charger 100. As an example, the receiver detectors 160 may use a Bluetooth connection between the wireless charger 100 and a device to detect the device, and then use received signal strength (RSS) of the communication link between the detected device and the charger 100 to track the location of the detected device. The signals generated by the receiver detectors 160 may also indicate whether the detected devices are within the near-field region of the transmitter antenna array 110. Further as shown, the receiver detectors 160 may receive feedback data from devices being wireless charged, which may provide measurements on the power received by these devices, such as amount, rate, efficiency, etc., as well as information on charge level, such as fully charged or 50% charged. The receiver detectors 160 may in turn provide the signals indicating locations of the detected devices and/or the feedback data to the processors 150. Based on this information, the processors 150 may control the phase shifters 130 and/or the amplifiers 140 to direct transmission of electromagnetic waves, for example in accordance with example methods described below.

As another example, the wireless charger 100 may include one or more person sensors 170. The person sensors 170 may include any type of sensor. For instance, person sensors 170 may include a visual sensor, such as a camera, or other types of optical sensors, such as infrared sensors. As such, image analysis and object or pattern recognition techniques may be used in conjunction with visual sensors to detect persons near the wireless charger 100. The person sensors 170 may also include motion sensors, radar, vibration sensors, audio sensors, heat sensors, etc. For example, breathing patterns or movement patterns of a person may be detected based on signals from motion sensor and/or vibration sensors. Additional or different sensors may also be employed. For example, person sensors 170 may include radiofrequency (RF) sensors configured to detect signals from beacons (such as Bluetooth beacons) installed at various locations in a room. As such, a person standing between the person sensors 170 and the installed beacons may cause signals emitted by the installed beacons to change, which may be detected by the person sensors 170. The person sensors 170 may in turn provide the signals indicating presence of persons to the processors 150, based on which the processors 150 may control the phase shifters 130 and/or the amplifiers 140 to direct transmission of electromagnetic waves, for example in accordance with example methods described below.

Figure 7:
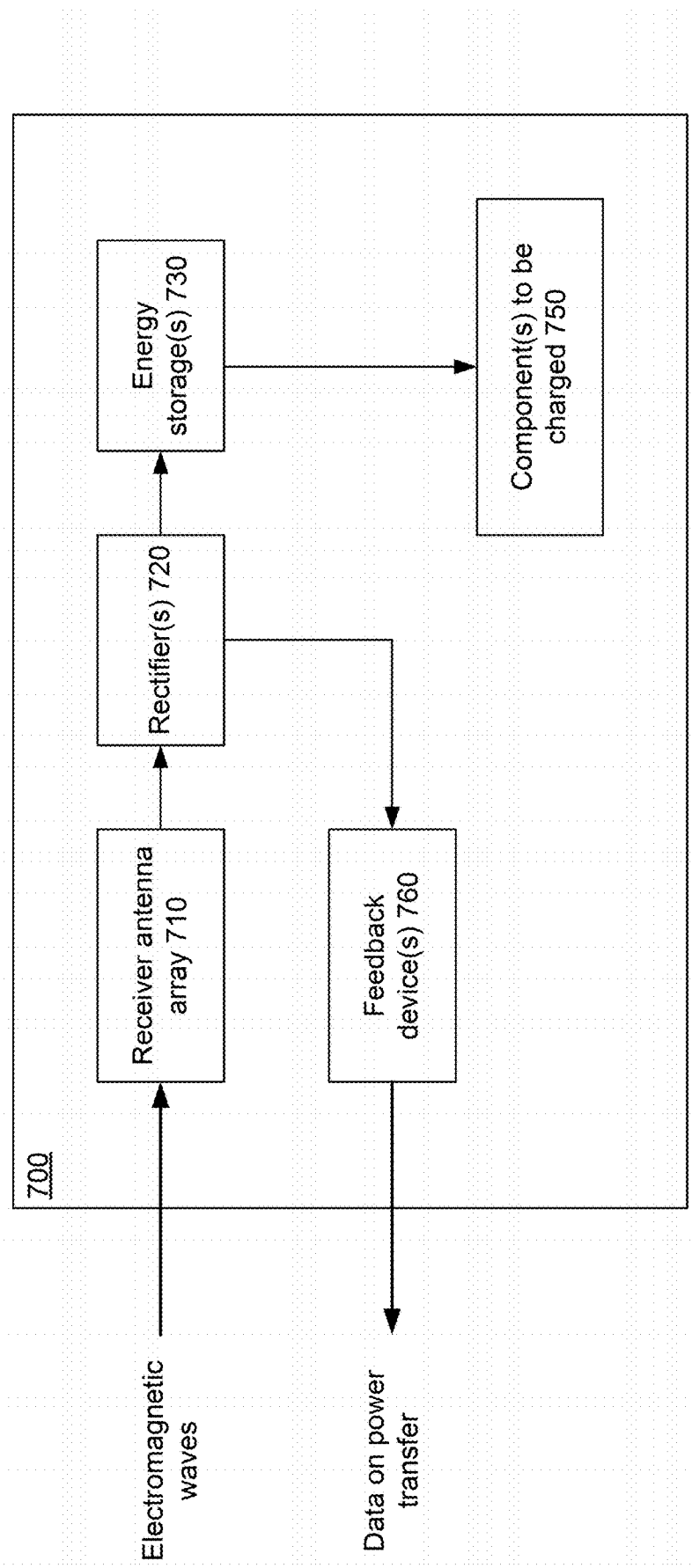
FIG. 7 is a block diagram of an example wirelessly charged device in accordance with aspects of the disclosure.

FIG. 7 is a block diagram illustrating an example wirelessly charged device 700. As shown, the wirelessly charged device 700 may include a receiver antenna array 710 configured to receive wirelessly transmitted power, for example from the wireless charger 100. Alternatively, the wirelessly charged device 700 may include a single receiver antenna. Although not shown, the receiver antenna array 710 may be configured with a similar configuration as that of the transmitter antenna array 110 of the wireless charger 100. For instance, the receiver antenna array 710 may also include a plurality of radiating elements arranged in rows and columns as shown in FIG. 2A. As with the transmitter antenna array 110, the receiver antenna array 710 may alternatively be any shape, such as a circle, an oval, a rectangle, a polygon, etc. The radiating elements of the receiver antenna array 710 may each have a square shape similar to the radiating elements 210, or alternatively have any other shape, such as rectangular, oval, square, polygon, etc. However, dimensions of the receiver antenna array 710 are constrained by the form factor of the wirelessly charged device 700, which may be relatively large (e.g., laptops, tablets), or relatively small (e.g., smartphone, smart watches). As one example, dimensions of the receiver antenna array 710 may be less than 5 cm, or within a range from 2 cm-5 cm. As one example, the receiver antenna array 710 may be a 4×4 array, where the dimensions of each radiating element may be within a range of 0.1 mm-10 mm and may have spacings of 5 mm-10 mm between one another. As with the transmitter antenna array 110, dimensions of the receiver antenna array 710 may be selected based on the operating frequency, and any other practical considerations.

Further, the receiver antenna array 710 may have a similar cross section as the transmitter antenna array 110 shown in FIG. 2B. For instance, the ground and the feed of the receiver antenna array 710 may be provided similarly as ground 220 and feeds 230. For example the ground may be provided in a layer below the radiating elements and the feeds may be provided as a feed network in a layer below the ground. Layers of the receiver antenna array 710 may have similar thicknesses as the transmitter antenna array 110.

The receiver antenna array 710 may also include a plurality of patch antennas, with configuration similar to the patch antenna 300 shown in FIG. 3. The patch antenna of the receiver antenna array 710 may also be circularly polarized and/or aperture fed. The patch antenna of the receiver antenna array 710 may be a monopole antenna, a dipole antenna, a slot antenna, a hybrid antenna, a loop antenna, an inverted-F antenna, etc.

As further shown in FIG. 7, the wirelessly charged device 700 may further include one or more rectifiers 720 and one or more energy storages 730. For example, the energy storages 730 may include one or more batteries, which may store electrical energy in direct current (DC). The rectifiers 720 may be configured to convert energy in the electromagnetic waves received from a wireless charger, such as wireless charger 100, into electrical energy. For example, rectifiers 720 may convert RF energy in radiofrequency waves into DC current, to be stored in the energy storages 730. The energy storages 730 may be connected to one or more components to be charged 750 in the wirelessly charged device 700. For example, these components may include one or more processors, user input, output devices, sensors, communication modules, etc.

In some instances, the wirelessly charged device 700 may further include one or more feedback devices 760. For instance, the feedback devices 760 may be configured to generate feedback data, which may include measurements on the power received by the wirelessly charged device 700, such as amount, charging rate (e.g. %/hr or watt/hr), power recovery efficiency, etc., as well as information on charge level, such as fully charged or 50% charged. The feedback devices 760 may be configured to send the feedback data wirelessly, for example via a Bluetooth link, to the wireless charger 100. As described above, the wireless charger 100 may use the feedback data to direct transmission of electromagnetic waves.

Figure 8:
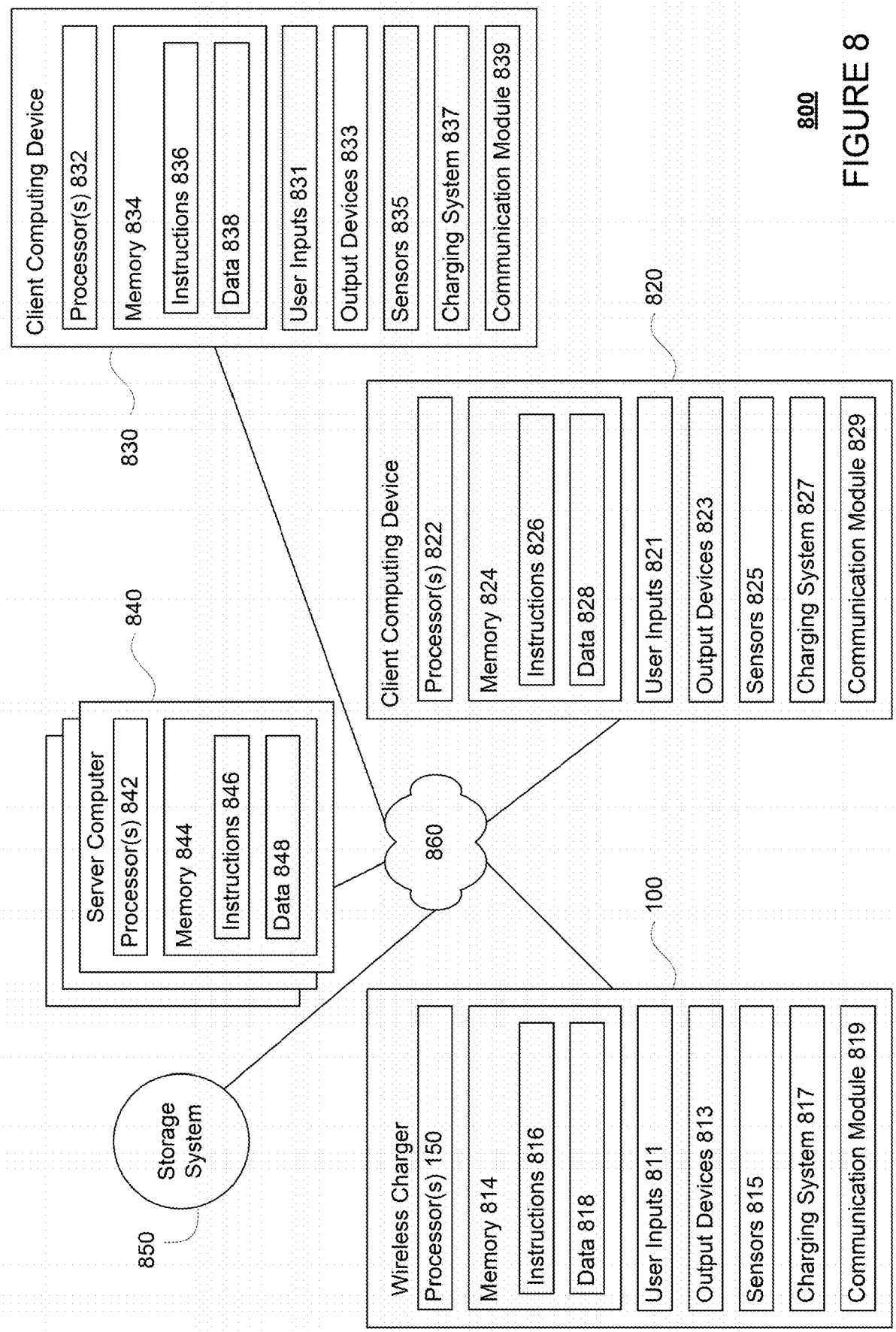
FIG. 8 illustrates an example wireless charging system in accordance with aspects of the disclosure.

FIG. 8 is a block diagram illustrating an example system 800 in which the features described herein may be implemented. It should not be considered as limiting the scope of the disclosure or usefulness of the features described herein. In this example, system 800 can include wireless charger 100, computing devices 820, 830, and 840, as well as storage system 850. For example as shown, wireless charger 100 contains one or more processors 150, memory 814 and other components typically present in general purpose computing devices.

Memory 814 can store information accessible by the one or more processors 150, including instructions 816 that can be executed by the one or more processors 150. Memory 814 can also include data 818 that can be retrieved, manipulated or stored by the processors 150. The memory 814 can be of any non-transitory type capable of storing information accessible by the processor, such as a hard-drive, memory card, ROM, RAM, DVD, CD-ROM, write-capable, and read-only memories.

The instructions 816 can be any set of instructions to be executed directly, such as machine code, or indirectly, such as scripts, by the one or more processors. In that regard, the terms "instructions," "application," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 818 can be retrieved, stored or modified by the one or more processors 150 in accordance with the instructions 816. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 150 can be any conventional processors, such as a commercially available CPU. Alternatively, the processors can be dedicated components such as an application specific integrated circuit ("ASIC") or other hardware-based processor. Although not necessary, wireless charger 100 may include specialized hardware components to perform specific computing processes.

Although FIG. 8 functionally illustrates the processor, memory, and other elements of wireless charger 100 as being within the same block, the processor, computer, computing device, or memory can actually comprise multiple processors, computers, computing devices, or memories that may or may not be stored within the same physical housing. For example, the memory can be a hard drive or other storage media located in housings different from that of the wireless charger 100. Accordingly, references to a processor, computer, computing device, or memory will be understood to include references to a collection of processors, computers, computing devices, or memories that may or may not operate in parallel. For example, the wireless charger 100 may include computing devices operating in a distributed system, etc. Yet further, although some functions described below are indicated as taking place on a single computing device having a single processor, various aspects of the subject matter described herein can be implemented by a plurality of computing devices, for example, communicating information over network 860.

Further as shown, wireless charger 100 may include charging system 827. For example, the charging system 827 may include components of FIG. 1, such as transmitter antenna array 110, power source 120, phase shifter 130, amplifier 140, receiver detectors 160, and person sensors 170.

In order to obtain information from and send information to remote devices, such as computing devices 820, 830, 840, wireless charger 100 may include a communication module, such as communication modules 819. The communication modules may enable wireless network connections, wireless ad hoc connections, and/or wired connections. Via the communication module, the computing devices may establish communication links, such as wireless links. For instance, the communication module 819 may include one or more antennas, transceivers, and other components for operating at radiofrequencies. The communication module 819 may be configured to support communication via cellular, LTE, 4G, WiFi, GPS, and other networked architectures. The communication module 819 may be configured to support Bluetooth®, Bluetooth LE, near field communications, and non-networked wireless arrangements. The communication modules 819 may support wired connections such as a USB, micro USB, USB type C or other connector, for example to receive data and/or power from a laptop, tablet, smartphone or other device. Using the communication module, the wireless charger 100 may be paired with one or more of the computing devices 820, 830, 840 for transmitting and/or receiving data from one another.

Each of the computing devices 820, 830, 840 can be at different nodes of a network 860 and capable of directly and indirectly communicating with other nodes of network 860. Although only a few computing devices are depicted in FIG. 8, it should be appreciated that a typical system can include a large number of connected computing devices, with each different computing device being at a different node of the network 860. The network 860 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

In some instances, the wireless charger 100 may further include additional components. For example as shown, the wireless charger 100 may include one or more user inputs 811, one or more output devices 813, and one or more sensors 815, which may be configured similarly as the user inputs 823, 833, output devices 823, 833, and sensors 825, 835 described in relation to computing devices 820 and 830 below. In other examples, to make the wireless charger 100 lightweight, the wireless charger 100 may not include one or more of user inputs 811, output devices 813, etc.

Each of the computing devices 820, 830, 840 may be configured similarly to the wireless charger 100, with one or more processors 822, 832, 842, and memory 824, 834, 844 storing instructions 826, 836, 846 and data 828, 838, 848, as described above. For instance as shown, computing devices 820 and 830 may each be a client computing device intended for use by a user, and have all of the components normally used in connection with a personal computing device such as a central processing unit (CPU), memory (e.g., RAM and internal hard drives) storing data and instructions, input and/or output devices, sensors, communication module, clock, etc. For example, one of the computing devices 820 or 830 may be the wirelessly charged device 700.

Although the computing devices 820, 830 may each comprise a full-sized personal computing device, they may alternatively comprise mobile computing devices capable of wirelessly exchanging data with a server over a network such as the Internet. For example, computing device 820 may be a laptop computer, or a tablet PC or a netbook that is capable of obtaining information via the Internet. As another example, computing device 830 may be a mobile phone, some other mobile device such as a wireless-enabled PDA. In other instances, one or more of the computing devices 820 and 830 may be a wearable computing device, for example such as a smartwatch or a head-mountable device. One or more computing devices 820 and 830 may also be smart home devices, such as a smart refrigerator, a smart TV, etc.

Computing devices 820 and 830 may include one or more user inputs, such as user inputs 821 and 831 respectively. For instance, user inputs may include mechanical actuators, soft actuators, periphery devices, sensors, and/or other components. For example, mechanical actuators may include buttons, switches, etc. Soft actuators may include touchpads and/or touchscreens. Periphery devices may include keyboards, mouse, etc. Sensors for user inputs may include microphones for detecting voice commands, visual or optical sensors for detecting gestures, etc.

Computing devices 820 and 830 may include one or more output devices, such as output devices 823 and 833 respectively. For instance, output devices may include a user display, such as a screen or a touch screen, for displaying information or graphics to the user. Output devices may include one or more speakers, transducers or other audio outputs. Output devices may include a haptic interface or other tactile feedback that provides non-visual and non-audible information to the user.

Computing devices 820 and 830 may include one or more sensors, such as sensors 825 and 835 respectively. For instance, sensors may include a visual sensor, such as a camera, or other types of optical sensors, such as infrared sensors. Sensors may include an audio sensor, such as a microphone. Sensors may also include motion sensors, such as an IMU. According to some examples, the IMU may include an accelerometer, such as a 3-axis accelerometer, and a gyroscope, such as a 3-axis gyroscope. The sensors may further include a barometer, a vibration sensor, a heat sensor, a radio frequency (RF) sensor, a magnetometer, and a barometric pressure sensor. Additional or different sensors may also be employed.

In order to be powered, computing devices 820 and 830 may include one or more charging systems, such as charging systems 827 and 837 respectively. The charging systems 827 and/or 837 may be configured to receive charges without requiring a conductive connection, such as a wired connection. In this regard, the charging systems 827 and/or 837 may be configured to be wirelessly charged in any of a number of ways, such as by radiative charging. For example, one or both of the computing devices 820 or 830 may be configured similarly as the wirelessly charged device 700. For instance, the charging systems 827 and/or 837 may include the receiver antenna array 710, rectifiers 720, energy storages 730, and feedback devices 760.

Additionally or alternatively, the charging systems 827 and/or 837 may be configured to be charged using conductive connection, such as a conductive contact or a wired connection. In instances where charging systems 827 and/or 837 are not configured for wireless charging, an accessory may be used to enable wireless charging. For example, a cover or a holder may be configured similarly as the wirelessly charged device 700, with receiver antenna array 710, rectifiers 720, energy storages 730, and feedback devices 760. The accessory may include one or more conductive elements, such as a contact, a wire, or a dongle, for connecting to the charging system 827 of computing device 820, or charging system 837 of computing device 830.

In order to obtain information from and send information to remote devices, such as wireless charger 100, server computer 840 and to each other, computing devices 820 and 830 may each include a communication module, such as communication modules 829 and 839 respectively. The communication modules 829 and/or 839 may be configured similarly as communication module 819.

The computing devices 820 and 830 may each include additional components. For example, computing devices 820 and 830 may include one or more internal clocks. The internal clocks may provide timing information, which can be used for time measurement for apps and other programs run by the computing devices, and basic operations by the computing devices, sensors, inputs/outputs, GPS, communication system, etc.

As with memory 814, storage system 850 can be of any type of computerized storage capable of storing information accessible by one or more of the computing devices 820, 830, 840, and/or wireless charger 100, such as a hard-drive, memory card, ROM, RAM, DVD, CD-ROM, write-capable, and read-only memories. In addition, storage system 850 may include a distributed storage system where data is stored on a plurality of different storage devices which may be physically located at the same or different geographic locations. Storage system 850 may be connected to the computing devices via the network 860 as shown in FIG. 8 and/or may be directly connected to any of the computing devices 820, 830, 840 and/or wireless charger 100.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Wireless chargers, such as the wireless charger 100 described above, may be used to charge one or more devices, such as the wirelessly charged device 700 described above. FIG. 9 is a pictorial diagram illustrating an example scenario of wireless charging using wireless charger 100. The wireless charger 100 is shown in an environment 900. For example, the environment may be a room in an office or a residence. As shown, the wireless charger 100 may be positioned in a drawer 920 of desk 910. Alternatively, the wireless charger 100 may be positioned on a surface of the desk 910, on or inside other furniture, wall, floor, incorporated in a smart home device, etc.

To avoid wasting energy, the wireless charger 100 may first detect whether wirelessly charged devices are in the environment 900 before controlling the transmitter antenna array 110 to transmit power. For instance, processors 150 of the wireless charger 100 may receive signals from receiver detectors 160, which may include locations of receiver antennas, such as location of receiver antenna array 710 of wirelessly charged device 700. Based on the signals, processors 150 of the wireless charger 100 may determine that the wirelessly charged device 700, computing device 820, and computing device 830, are in the environment 900, and are equipped with receiver antennas for wirelessly receiving power. As another example, the receiver detectors 160 may not have detected any receiver antenna in device 930.

Further in this regard, since the wireless charger 100 as described above is configured to focus electromagnetic waves within the radiative near-field, to ensure efficient power transfer, the wireless charger 100 may further determine whether devices detected in environment 900 are located within the radiative near-field of the transmitter antenna array 110. For example, based on signals received from the receiver detectors 160, processors 150 of the wireless charger 100 may determine that, while wirelessly charged device 700 and computing device 820 are located within the radiative near-field of the transmitter antenna array 110, computing device 830 is located outside the radiative near-field of the transmitter antenna array 110.

The wireless charger 100 may focus electromagnetic waves on one of the wirelessly charged devices detected within the radiative near-field of the wireless charger 100. For instance, processors 150 of the wireless charger 100 may control the plurality of radiating elements 210 of the transmitter antenna array 110 to focus electromagnetic waves. For example as shown, the wireless charger 100 may focus electromagnetic waves on wirelessly charged device 700. In this regard, the processors 150 may control the phase shifters 130 and/or the amplifiers 140 to change direction and amplitude of the electromagnetic waves, as described in relation to FIG. 4.

Once focused on a receiver antenna, the wireless charger 100 may control the transmitter antenna array to transmit power to the receiver antenna. For instance, processors 150 of the wireless charger 100 may control the power source 120 to transmit RF waves to be transmitted by the transmitter antenna array 110.

During charging, the wireless charger 100 may be configured to re-focus the electromagnetic waves based on feedback data. As described above with respect to FIGS. 1 and 7, processors 150 may receive feedback data on power transfer, such as measurements on charging rate, or power recovery efficiency, from the feedback device 760 of the wirelessly charged device 700. For instance, if the charging rate and/or power recovery efficiency drops to a predetermined threshold, processors 150 may control the transmitter antenna array 110, the phase shifters 130, and/or the amplifiers 140 to re-focus the electromagnetic waves. Further in this regard, the processors 150 may receive signals from the receiver detectors 160, and determine whether a location of the wirelessly charged device 700 has changed, and re-focus electromagnetic waves based on any change in the location.

Before or during charging, the wireless charger 100 may detect one or more persons in the environment. FIGS. 10A and 10B are pictorial diagrams illustrating an example scenario of wireless charging when a person is detected in a vicinity of charger 100. FIGS. 10A and 10B show an environment 1000, with many similar items as environment 900 shown in FIG. 9, and are labeled as such. For example, as in environment 900, environment 1000 includes wireless charger 100 positioned in a drawer 920 of desk 910. Further, wirelessly charged device 700, computing devices 820 and 830, and device 930 are also shown in environment 1000.

Referring to FIG. 10A, environment 1000 further includes a person 1010, which may be detected by wireless charger 100. For example as shown, person 1010 might have walked into environment 1010 and picked up the wirelessly charged device 700. For instance, person sensors 170 of the wireless charger 100 may generate signals on light, sounds, heat, movement, etc. in the environment 1000. As another example, person sensors 170 may detect interference to signals emitted from a beacon 1020 in the environment 1000, such as a Bluetooth beacon. As such, processors 150 of the wireless charger 100 may receive the signals, and determine based on the signals that a person is in the environment 1000. In this regard, processors 150 may use image analysis, object or pattern recognition, and/or any appropriate analytic tools to determine whether the signals indicate that a person is in the environment 1000. For example as shown, processors 150 of the wireless charger 100 may determine that person 1010 is in the environment 1000.

Once a person is detected in the environment of the wireless charger 100, the wireless charger 100 may stop charging, as indicated by the cross. For instance, once processors 150 determine that person 1010 is in the environment 1000, processors 150 may control the power source 120 to stop supplying power to the transmitter antenna array 110, thereby stopping charging. As such, the wireless charger 100 may avoid transmitting radiation to a person.

Alternatively, wireless charger 100 may only stop charging if the person is detected within the radiative near-field of the wireless charger 100. For instance as described above with relation to FIG. 5, the amplitude of power transfer drops quickly outside of the radiative near-field of the transmitter antenna array 110 that is near-field focused. Thus, it may not be necessary to stop charging when the person 1010 is outside the radiative near-field of the transmitter antenna array 110.

As another alternative, wireless charger 100 may only stop charging if the person is detected in a direction of the electromagnetic waves transmitted from the wireless charger 100. For instance, processors 150 may further determine a position of the detected person based on signals received from the person sensors 170, and compare with the direction of the electromagnetic waves being transmitted. For example as shown, the processors 150 may determine that the electromagnetic waves are focused in a direction towards wirelessly charged device 700, which is in the same direction as the person 1010. Thus, processors 150 may determine to stop charging the wirelessly charged device 700.

Referring to FIG. 10B, additionally or alternatively, the wireless charger 100 may charge another device if a person is detected. The wireless charger 100 may start charging a different device after stopping charging wirelessly charged device 700, or redirect the electromagnetic waves to a different device without ever stop charging. For example, processors 150 of the wireless charger 100 may determine, based on the signals from receiver detectors 160, that computing device 820 is located within the radiative near-field of the transmitter antenna array 110, but located not in the same direction as the detected person 1010. Thus, processors 150 of the wireless charger 100 may control the transmitter antenna array 110 to focus electromagnetic waves on the computing device 820.

As still another example, the wireless charger 100 may be configured to detect persons and/or devices at different rates based on the environment 1000. In this regard, the wireless charger 100 may allow a user to select person detection rate, or choose a setting such as "office," "living room," "bedroom," etc. For instance, if the environment is a bedroom, receiver detectors 160 and/or person sensors 170 may be set to a lower detection rate, since charging is likely to occur at night when a person is sleeping, and thus the person as well as devices in the room are likely to remain in relatively fixed position with respect to the wireless charger 100. In contrast, if the environment is an office or a living room, receiver detectors 160 and/or person sensors 170 may be set to a higher detection rate, since different persons may move around in such an environment during the day, and may also move the devices within the environment.

In another aspect, the wireless charger 100 may be configured to determine a time division scheme to transmit power to multiple wirelessly charged devices. FIGS. 11A and 11B are pictorial diagrams illustrating an example scenario of wireless charging using a time division scheme. FIGS. 11A and 11B show an environment 1100, with similar items as environment 900 shown in FIG. 9, and are labeled as such. For example, as in environment 900, environment 1100 includes wireless charger 100 positioned in a drawer 920 of desk 910. Further, wirelessly charged device 700, computing devices 820 and 830, and device 930, are also shown in environment 1100.

For instance as described above, wireless charger 100 have detected wirelessly charged device 700 and computing device 820 as capable of wirelessly being charged and located within the radiative near-field of the transmitter antenna array 110. Wireless charger 100 may determine any of a number of time division schemes for charging both wirelessly charged device 700 and computing device 820. For example as shown in FIG. 11A, the time division scheme may be to charge the wirelessly charged device 700 for a time period T1 until it is fully charged, then switch to the computing device 820 as shown in FIG. 11B, and charge computing device 820 for a time period T2 until computing device 820 is also fully charged. As another example, the time division scheme may be to charge each device for a fixed time period, and switch between charging the two devices until both are fully charged. For instance, the wireless charger 100 may alternate between charging wirelessly charged device 700 for a fixed time period as shown in FIG. 11A and charging computing device 820 for a fixed period as shown in FIG. 11B, until both are fully charged. In this example, T1 and T2 may be the same, such as 10 minutes each. With such time division schemes, multiple devices may be charged wirelessly in environment 900, without requiring extra wires, coils, cables, etc.

Further in this regard, the wireless charger 100 may be configured to determine time division schemes based on the environment 1100. For instance, if the environment is a bedroom, the time division scheme may be to charge each device until fully charged, since the charging is likely to occur at night when devices in the room are likely to remain in relatively fixed position with respect to the wireless charger 100. In contrast, if the environment is an office or a living room, the time division scheme may be may be to charge each device at shorter intervals, since devices in such an environment may be frequently moved around during the day, and it may be beneficial to ensure that none of the devices is completely depleted of charge. In addition or as alternative to time division scheme, the transmitter antenna array 110 may generate multiple beams of electromagnetic waves to simultaneously charge multiple devices.

Figure 12:
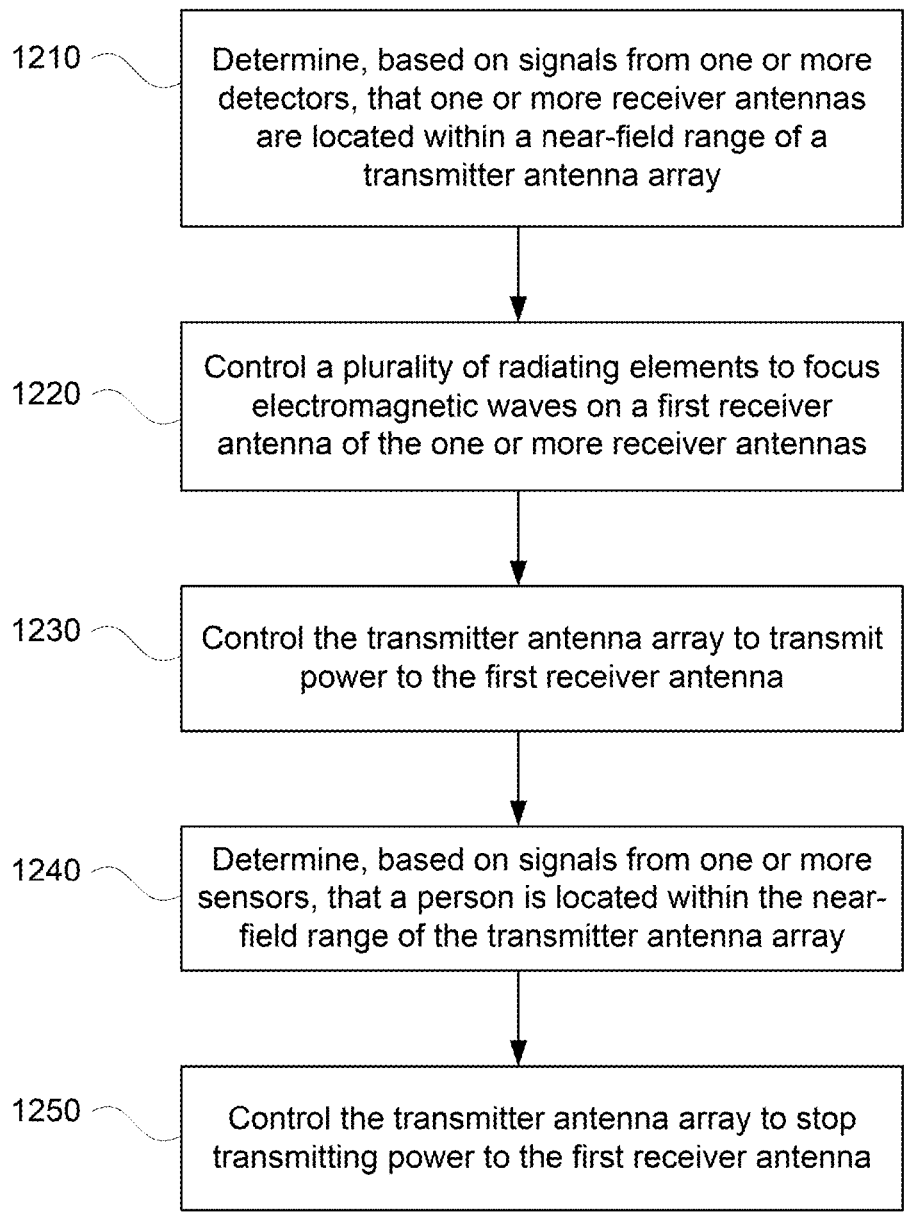
FIG. 12 is a flow diagram in accordance with aspects of the disclosure.

FIG. 12 is a flow diagram illustrating an example method 1200 for wirelessly charging a device. For instance, operations shown in the flow diagram may be performed by the example systems described herein, such as by one or more processors 150 of the wireless charger 100. Although FIG. 12 illustrates operations for an example method, other methods may include additional and/or alternative operations, including those described above in relation to FIGS. 9, 10A, 10B, 11A, 11B and example systems in FIGS. 1-8. While the operations are illustrated and described in a particular order, it should be understood that the order may be modified and that operations may be added or omitted.

Referring to FIG. 12, in block 1210, it is determined, based on signals from one or more detectors, that one or more receiver antennas are located within a near-field range of a transmitter antenna array. In block 1220, a plurality of radiating elements are controlled to focus electromagnetic waves on a first receiver antenna of the one or more receiver antennas. In block 1230, the transmitter antenna array is controlled to transmit power to the first receiver antenna. In block 1240, it is determined, based on signals from one or more sensors, that a person is located within the near-field range of the transmitter antenna array. In block 1250, the transmitter antenna array is controlled to stop transmitting power to the first receiver antenna.

The technology is advantageous because it provides for efficient wireless charging. The technology described herein allows a high level of power to be transferred in the near-field region, and at the same time allow the power to quickly attenuate to a low level in the far-field region. This enables efficient power transfer to devices within the near-field region, as well as reduces interference with devices in the far-field region. By automatically focusing electromagnetic waves on detected devices, a user does not need to manually plug in the device to be charged, or align a coil in the device to a coil in a charger. By adjusting operating frequency and other parameters of the wireless charger, the wireless charger may be designed to conveniently fit in everyday environments, such as on or inside furniture, and to charge devices within distances common in practical situations, such as within a meter or so in a room of a residence or office. By using an operating frequency outside of wireless communication ranges, the wireless charger may be able to increase level of power transfer without causing interference with other devices. Aspects of the technology further provides for detection mechanism to avoid transmitting radiation to persons near the wireless charger. The technology further provides for time division for charging multiple devices without requiring extra accessories such as wires, coils, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A wireless charger, comprising:
a transmitter antenna array including a plurality of radiating elements;
one or more detectors configured to collect signals from one or more receiver antennas;
one or more sensors configured to generate signals indicating presence of a person;
one or more processors configured to:
determine, based on the signals from the one or more detectors, that one or more of the receiver antennas are located within a near-field range of a transmission field of the transmitter antenna array, the near-field range being a sub-region of the transmission field;
control the plurality of radiating elements to focus electromagnetic waves on a first focal point within the near-field range, the first focal point corresponding to a first receiver antenna of the one or more receiver antennas;
control the transmitter antenna array to transmit power to the first receiver antenna;
determine, based on the signals from the one or more sensors, that the person is located within the near-field range of the transmitter antenna array; and
control the transmitter antenna array to stop transmitting power to the first receiver antenna.

2. The wireless charger of claim 1, wherein the one or more processors are further configured to:
determine, based on the signals from the one or more detectors and the signals from the one or more sensors, whether the person is located in a direction of the power transmission, wherein controlling the transmitter antenna array to stop transmitting power to the first receiver antenna is further based on determining that the detected person is located in the direction of the power transmission.

3. The wireless charger of claim 2, wherein the one or more processors are further configured to:
determine, based on the signals from the one or more detectors and the signals from the one or more sensors, that the person is not located in a direction of a second receiver antenna of the one or more receiver antennas;
control the plurality of radiating elements to focus electromagnetic waves on the second receiver antenna; and
control the transmitter antenna array to transmit power to the second receiver antenna.

4. The wireless charger of claim 1, wherein the one or more sensors include at least one of: an optical sensor, a camera, a motion sensor, a radar, or an RF sensor.

5. The wireless charger of claim 1, wherein an operating frequency of the transmitter antenna array is outside frequency ranges for wireless communication.

6. The wireless charger of claim 1, wherein an operating frequency of the transmitter antenna array is 24 GHz.

7. The wireless charger of claim 1, wherein dimensions of the transmitter antenna array are within a range of 10 cm-20 cm.

8. The wireless charger of claim 1, wherein spacings between the plurality of radiating elements are within a range of 0.5 cm-1cm.

9. The wireless charger of claim 1, wherein the plurality of radiating elements are provided on a two-dimensional surface.

10. The wireless charger of claim 1, wherein the plurality of radiating elements are provided on one or more surfaces of a three-dimensional structure.

11. The wireless charger of claim 1, wherein a boundary of the near-field range is between 0.5-2 meter.

12. The wireless charger of claim 1, further comprising:
one or more phase shifters configured to change phases of the electromagnetic waves from the plurality of radiating elements, wherein the one or more processors are further configured to control the one or more phase shifters to focus the electromagnetic waves on the first receiver antenna.

13. The wireless charger of claim 1, further comprising:
one or more amplifiers configured to change amplitudes of the electromagnetic waves from the plurality of radiating elements, wherein the one or more processors are configured to control the one or more amplifiers to focus the electromagnetic waves on the first receiver antenna.

14. The wireless charger of claim 1, wherein the one or more detectors are further configured to:
receive measurements of power received by the first receiver antenna through a Bluetooth link, wherein the one or more processors are further configured to control the plurality of radiating elements to focus the electromagnetic waves on the first receiver antenna based on the measurements of power received.

15. The wireless charger of claim 1, wherein the one or more processors are further configured to:
determine, based on the signals from the one or more detectors, that the one or more receiver antennas include a plurality of receiver antennas; and
determine a time division to focus the electromagnetic waves and transmit power to each of the plurality of receiver antennas.

16. The wireless charger of claim 1, wherein the transmission field includes a non-radiative range and a far-field range.

17. An antenna system, comprising:
a transmitter antenna array comprising a plurality of radiating elements, the transmitter antenna array having an operating frequency higher than frequency ranges for wireless communication;
one or more receiver antenna arrays each comprising a plurality of radiating elements, the one or more receiver antenna arrays being located within a near-field range of a transmission field of the transmitter antenna array, the near-field range being a sub-region of the transmission field; and
the transmitter antenna array configured to stop transmitting power to the one or more receiver antenna arrays when a person is located within the near-field range of the transmitter antenna array.

18. The antenna system of claim 17, further comprising:
one or more rectifier configured to convert RF received by the one or more receiver antenna arrays into electrical energy; and
one or more energy storage units configured to store the electrical energy.

19. The antenna system of claim 17, further comprising:
one or more feedback devices configured to:
generate measurements on power received by the one or more receiver antenna arrays; and
send the measurements to one or more processors associated with the transmitter antenna array through a Bluetooth link.

20. The antenna system of claim 17, wherein a boundary of the near-field range of the transmitter antenna array is at 0.5-2 meter.

21. An antenna array, comprising:
a plurality of antenna radiating elements,
   wherein an operating frequency of the antenna array is higher than frequency ranges for wireless communication,
   wherein a near-field range of a transmission field of the antenna array is between 0.5-2 meter, the near-field range being a sub-region of the transmission field, and
   wherein the plurality of antenna radiating elements are configured to stop transmitting to a receiver when a person is located within the near-field range of the antenna array.

* * * * *